United States Patent [19]

Lee et al.

[11] Patent Number: 5,799,101

[45] Date of Patent: Aug. 25, 1998

[54] METHOD AND APPARATUS FOR HIGHLY EFFICIENT COMPUTER AIDED SCREENING

[75] Inventors: Shih-Jong J. Lee, Bellevue; Seho Oh, Mukilteo; Stanley F. Patten, Issaquah; Alan C. Nelson, Redmond; Larry A. Nelson, Bellevue, all of Wash.

[73] Assignee: NeoPath, Inc., Redmond, Wash.

[21] Appl. No.: 897,392

[22] Filed: Jul. 21, 1997

Related U.S. Application Data

[63] Continuation of Ser. No. 315,719, Sep. 30, 1994, abandoned.

[51] Int. Cl.⁶ .............................. G06K 9/00; G01N 33/48
[52] U.S. Cl. .............................. 382/133; 128/922; 356/92; 382/134
[58] Field of Search .............................. 382/128, 129, 382/130, 133, 134; 356/39, 36, 37, 38, 40, 42; 377/10, 11, 12, 13; 128/922; 427/2.11

[56] References Cited

U.S. PATENT DOCUMENTS

| | | | |
|---|---|---|---|
| 3,699,336 | 10/1972 | Ehrlich et al. | 250/3.3 UV |
| 3,824,393 | 7/1974 | Brain | 250/73 |
| 3,916,176 | 10/1975 | Alien et al. | 235/151.3 |
| 4,045,655 | 8/1977 | Suzuki et al. | 377/10 |
| 4,097,845 | 6/1978 | Bacus | 382/197 |
| 4,129,854 | 12/1978 | Suzuki et al. | 340/146.3 CA |
| 4,150,360 | 4/1979 | Kopp et al. | 340/146.3 P |
| 4,175,860 | 11/1979 | Bacus | 356/39 |
| 4,210,419 | 7/1980 | Castleman | 230/230 B |
| 4,213,036 | 7/1980 | Kopp et al. | 235/92 PC |
| 4,296,373 | 10/1981 | Angel et al. | 324/71 CP |
| 4,523,278 | 6/1985 | Reinhardt et al. | 364/413 |
| 4,596,464 | 6/1986 | Hoffman et al. | 356/336 |
| 4,741,043 | 4/1988 | Bacus | 382/133 |
| 4,965,725 | 10/1990 | Rutenberg | 364/413.1 |
| 5,073,857 | 12/1991 | Peters et al. | 364/413.1 |
| 5,086,476 | 2/1992 | Bacus | 382/133 |
| 5,172,418 | 12/1992 | Ito et al. | 382/132 |
| 5,235,522 | 8/1993 | Bacus | 382/133 |
| 5,257,182 | 10/1993 | Luck et al. | 364/413.1 |
| 5,260,871 | 11/1993 | Goldberg | 364/413.02 |
| 5,268,966 | 12/1993 | Kasdan | 382/6 |
| 5,287,272 | 2/1994 | Rutenberg et al. | 382/133 |
| 5,313,532 | 5/1994 | Harvey et al. | 382/15 |
| 5,315,700 | 5/1994 | Johnston et al. | 395/163 |
| 5,361,140 | 11/1994 | Hayenga et al. | 358/446 |
| 5,413,116 | 5/1995 | Radke et al. | 128/777 |

OTHER PUBLICATIONS

A Processing Strategy for Automated Papanicola on Smear Screening James S. Lee et al. Analytical and Quantatitative Cytology and Histology vol. 14 No. 5, Oct. 1992.

Bacus, James W. and Les J. Grace, "Optical Microscope System For Standardized Cell Measurements and Analyses", *Applied Optics*, 26:16, pp. 3280–3293, 15 Aug. 1987.

Bartels, Peter H. et al., "A Self-Learning Computer Program for Cell Recognition", *ACTA Cytologica: The Journal of Clinical Cytology*, 14:8, pp. 486–494, Oct. 1970.

Tanaka, Noboru et al., "Automated Cytologic Screening System (CYBEST Model 4) : an Integrated Image Cytometry System", *Applied Optics*, vol. 26, No. 16, pp. 3301–3307, Aug. 15, 1987. Copyright ©1987 by the Optical Society of America.

(List continued on next page.)

*Primary Examiner*—Bipin Shalwala
*Attorney, Agent, or Firm*—Hans I. Sun; Emil Moffa

[57] ABSTRACT

A computer aided biological specimen screener is responsive to a priori information about biological specimens. An automated slide classifier scans a slide specimen and generates a set of scores. The classification which results from this set of scores depends on a priori information concerning the patient, such as patient age and prior health history and diagnosis. Using the patient information and an appropriate score, the specimen is classified. A normal threshold used for classification is changed over a wide range depending on the specificity appropriate to a particular patient risk category. The sensitivity of the classification is automatically maximized for a predetermined normal specificity.

33 Claims, 22 Drawing Sheets

OTHER PUBLICATIONS

Tou, J.T. et al., p. 20 and "Chapter 3: Pattern Classification By Distance Functions", *Pattern Recognition Principles*, pp. 75–109, Addison–Wesley Publishing Company, 1974.

Duda, Richard O. and Peter E. Hart, "Fisher's Linear Discriminant", *Patent Classification and Scene Analysis*, Copyright ©1973, pp. 114–121.

Weber, J.E. et al., "Fuzzy Reasoning, Possibility Theory and Probability Theory in Expert Systems for Histopathology", IEEE/Ninth Annual Conference of the Engineering in Medicine and Biology Society, pp. 1560–1562, ©1987.

Wied, G.L. et al., "Expert Systems as Classifiers in Diagnostic Cytopathology", IEEE/Ninth Annual Conference of the Engineering in Medicine and Biology Society, pp. 1915–1917, ©1987.

Wied, G.L. et al., "Expert System Design Under Uncertainty of Human Diagnosticians", IEEE/Eighth Annual Conference of the Engineering in Medicine and Biology Society, pp. 757–760, ©1986.

Wied, G.L. et al., "Ticas–Stratex, an Expert Diagnostic System For Stratified Cervical Epithelium", IEEE/Ninth Annual Conference of the Engineering in Medicine and Biology Society, pp. 1557–1559, ©1987.

Serra, J., *Image Analysis and Mathematical Morphology*, pp. 372–423, Academic Press, 1982.

Smith, Warren J., "Image Evaluation", *Modern Optical Engineering*, McGraw–Hill Book Company, 1966, pp. 308–325.

Patten, Jr., Stanley, "Diagnostic Cytopathology of the Uterine Cervix", Basel, Switzerland, Publisher: S. Karger, 1969, 2nd Edition 1978, Third volume in *Monographs in Clinical Cytology*, edited by G.L. Wied, pp. 10–15.

Kurman, Robert J. et al., "Part 1: Specimen Adequacy" and Part 2: Descriptive Diagnoses, *The Bethesda System for Reporting Cervical/Vaginal Cytologic Diagnoses*, Springer–Verlag.

Dytch, Harvey E. et al., "An Interactive Microcomputer-Based System for the Quantitative Analysis of Stratified Tissue Sections", *Analytical and Quantitative Cytology and Histology*, vol. 9, No. 1, pp. 69–78, Mar. 1987.

Enslein, Kurt and Peter W. Neurath, "Augmented Stepwise Discriminant Analysis Applied to Two Classification Problems in the Biomedical Field", *Computers and Biomedical Research*, 2, 568–581 (1969).

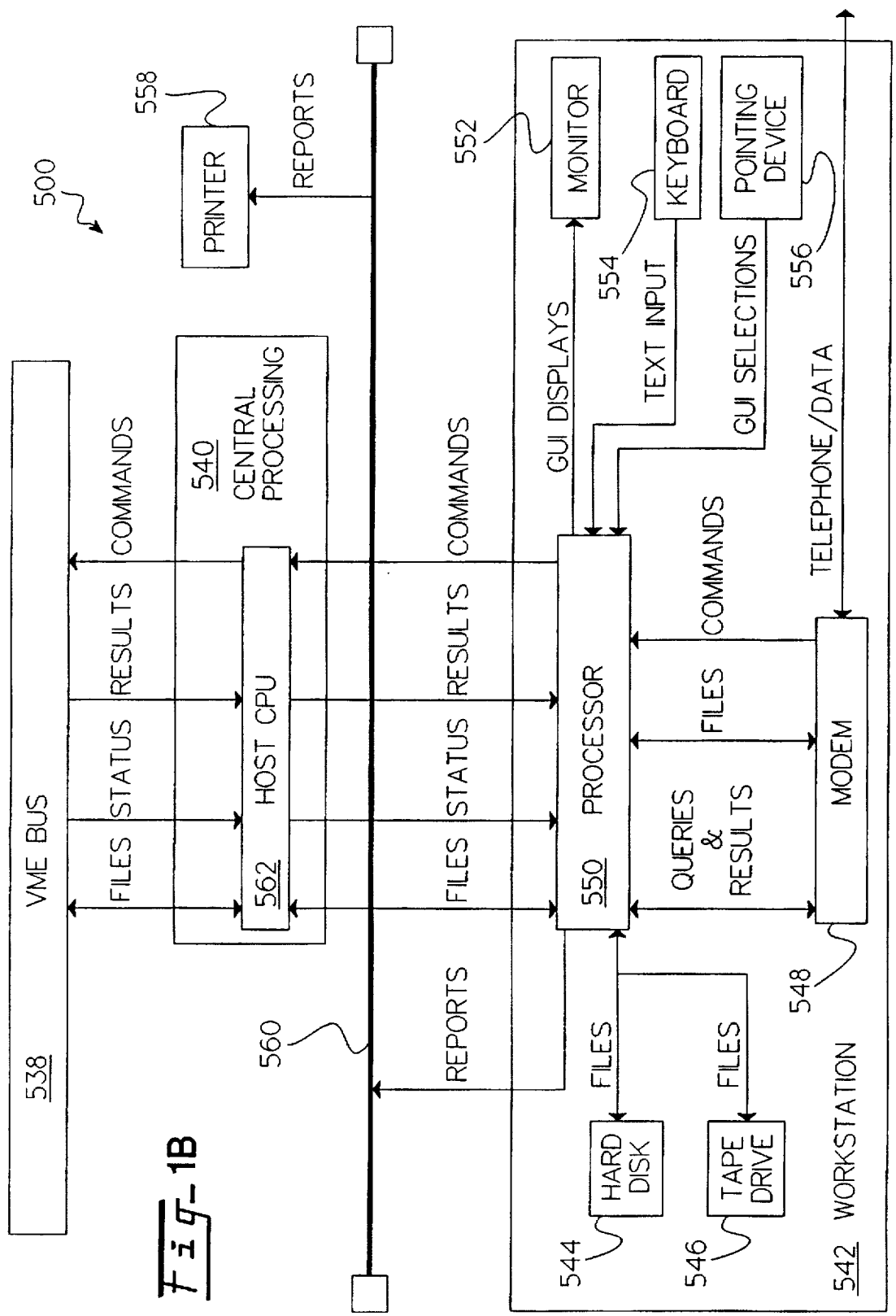

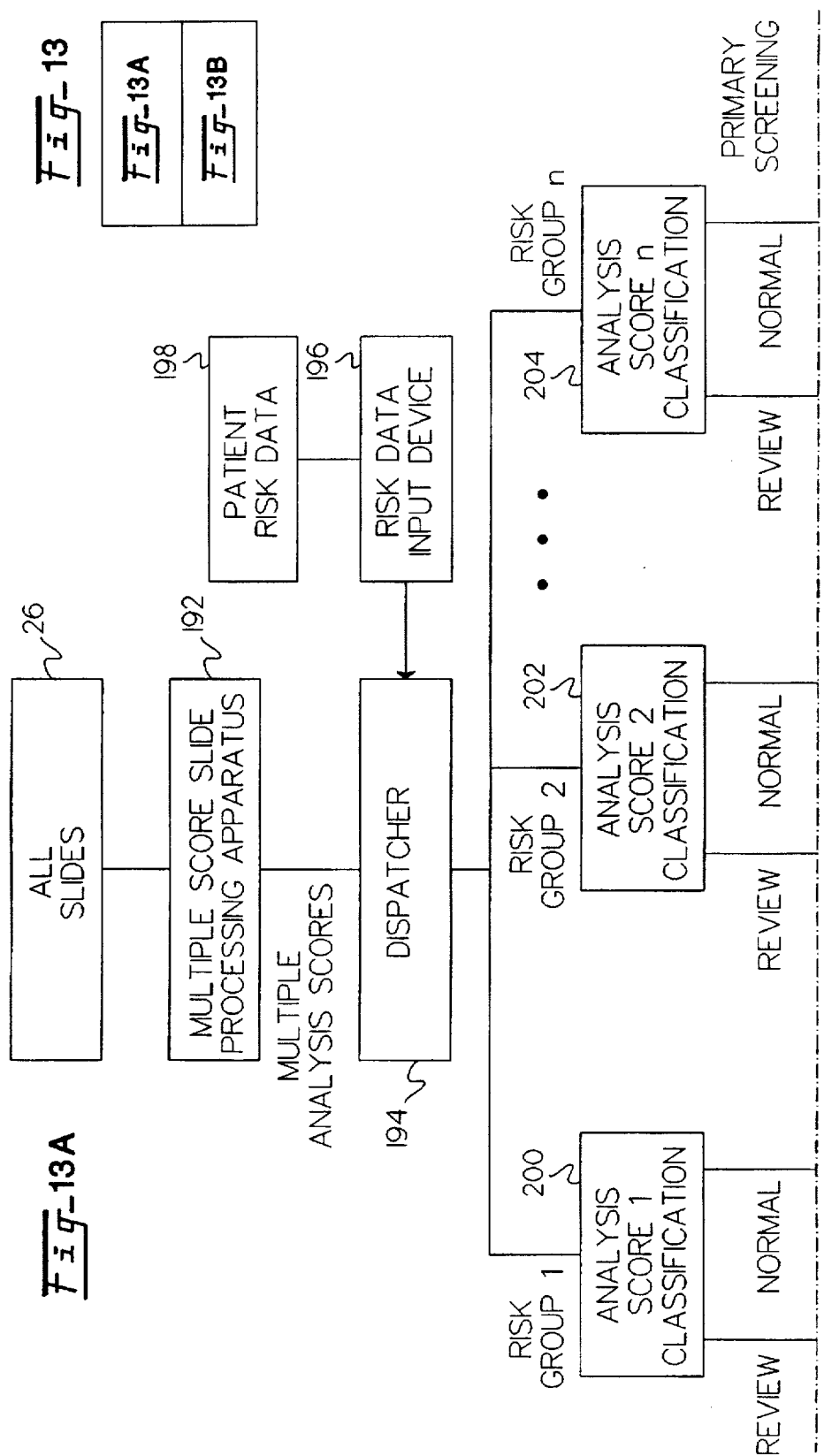

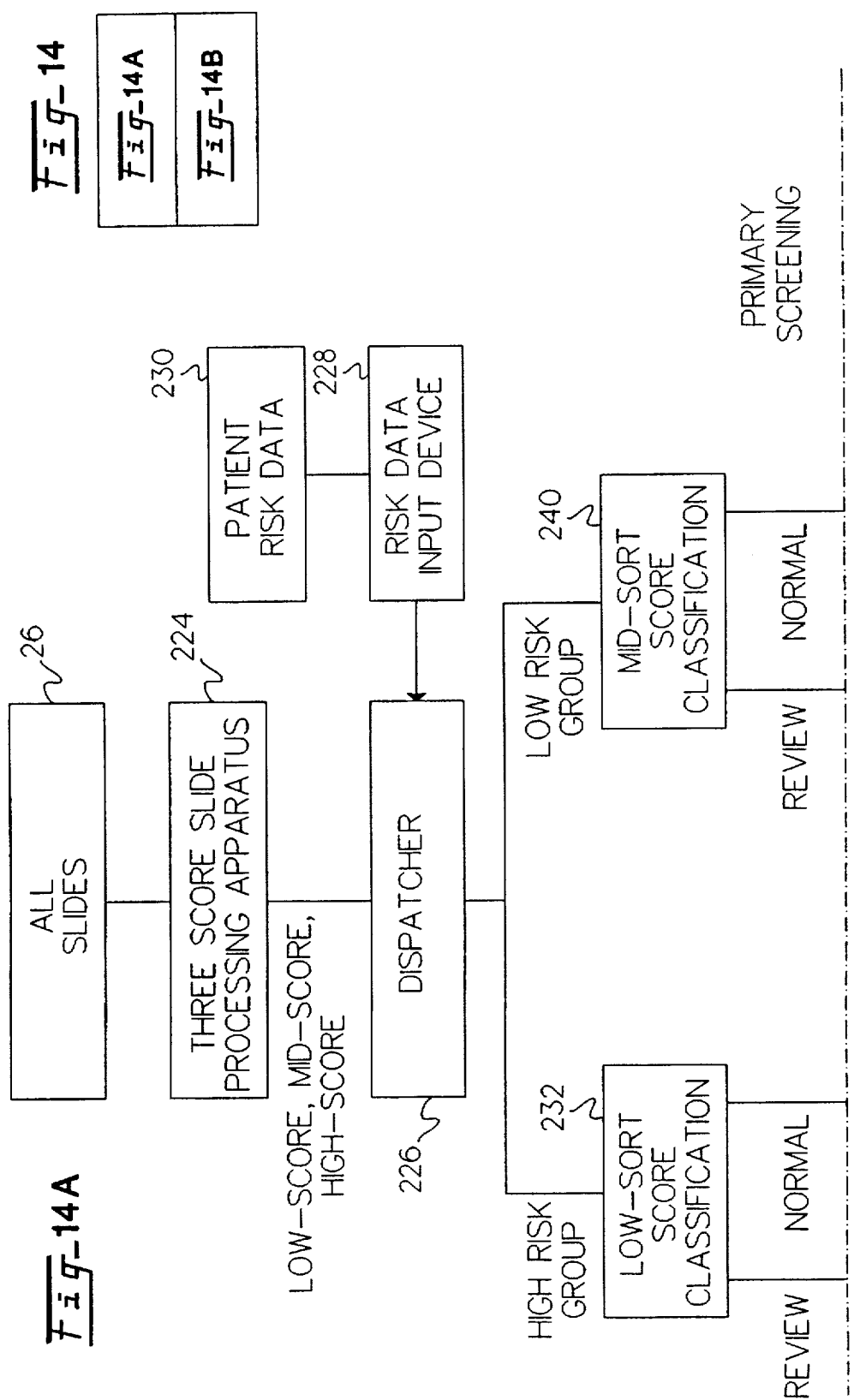

METHOD AND APPARATUS FOR HIGHLY EFFICIENT COMPUTER AIDED SCREENING

This application is a continuation of application Ser. No. 08/315,719, Sep. 30, 1994, now abandoned.

The invention relates to a computer aided biological specimen screener and, more particularly, to an automated screening and quality control system where specimens to be screened may be categorized using patient information.

BACKGROUND OF THE INVENTION

Historically, screening of biological specimens has been a task for trained technicians such as cytotechnologists. Even though screening is done by highly trained individuals, the task is repetitive and requires acute attention at all times. Since screening of cytologic material is repetitive and tedious, it has been thought to be ripe for automation. On the other hand, the complexity and variety of material found in cytologic specimens has proven very difficult to examine in an automated fashion. Prior art screeners have virtually ignored any discrimination potential from a priori knowledge of a specimens characterization. As a result, automated screening of biological specimens has been an unrealized goal of research for many years.

Work flows in medical labs and scientific and industrial inspection stations bear a high degree of variability dependent on their practice and the populations of the items being inspected. One type of lab, a cytology lab, screens biological specimens prepared by the Papanicolaou method. There are two basic screening modes in a cytology lab for Pap smear screening including a primary screening mode and a quality control screening mode. One type of characterization of a biological specimen is derived from a level of patient risk determined when the specimen is taken by the physician. A set of high risk patients can normally be identified in a lab based on the patient history and other clinical information. The high risk patients may receive special attention during the screening process.

As automated screening and computer-aided diagnosis devices, such as the Autopap® 300QC available from NeoPath, Inc. of Bellevue, Wash., are becoming available to medical labs and other inspection stations, it is important to develop methods to integrate the automated devices into laboratory practice to maximize the cost effectiveness of the devices based on the work flow of the particular laboratory.

The current practice of applying automated systems ignores specimen a priori characterization such as patient risk. The prior art treats all specimens alike.

It is, therefore, a motive of the invention to adjust automated screening and quality control to incorporate an a priori characterization of biological specimens.

SUMMARY OF THE INVENTION

The invention provides a multiple score slide processing apparatus for classification of biological specimens comprising a means for acquiring at least one image from the biological specimen having at least one image output; a means for obtaining at least one slide feature from the at least one image having at least one slide feature output; a plurality of score generators, each connected to the at least one slide feature output and each having an analysis score output; and a plurality of classification modules, each connected to an analysis score output and each having a classification output. The invention also provides a dispatcher to dispatch slides to a particular classifier based on an a priori characterization of the biological specimen such as a patient risk level. In one embodiment the invention provides a combination of a high-sort, mid-sort, and low-sort classification. Parameters are matched to laboratory processes and practices, populations and system performance characteristics. The parameters are adjusted to maximize the abnormal slide detection sensitivity given a desirable normal slide review rate.

The method of the invention provides a practical solution to maximize the cost effectiveness of the utilization of an automated screening system to match the practice of a laboratory or an inspection station.

It is one object of the invention to provide a highly effective primary screening configuration.

It is another object of the invention to provide a highly effective quality control screening configuration.

It is yet a further object of the invention to provide a highly effective combination of primary and quality control screening.

It is another object of the invention to automatically determine the optimal parameters to match lab practices.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIG. 1B shows a schematic block diagram of the processing system of the apparatus of the invention.

3

Figure 15:
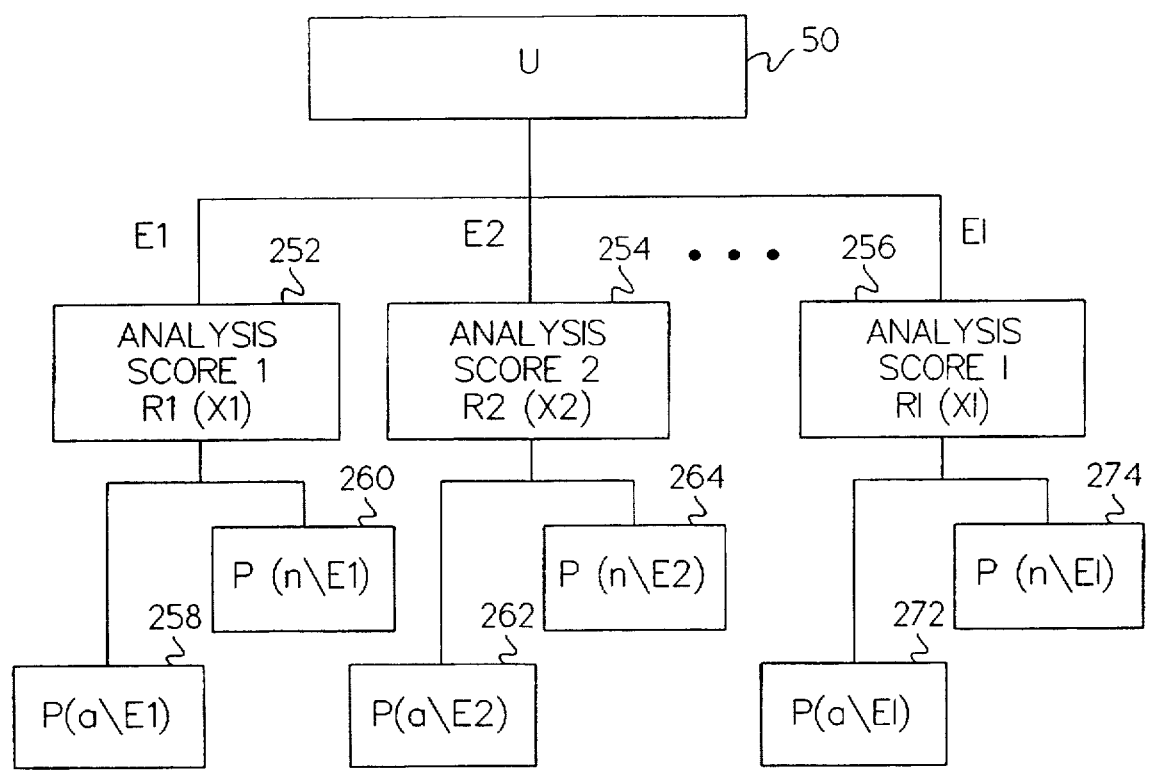

FIG. 15 shows a modeling diagram used in the invention.

Figure 16:
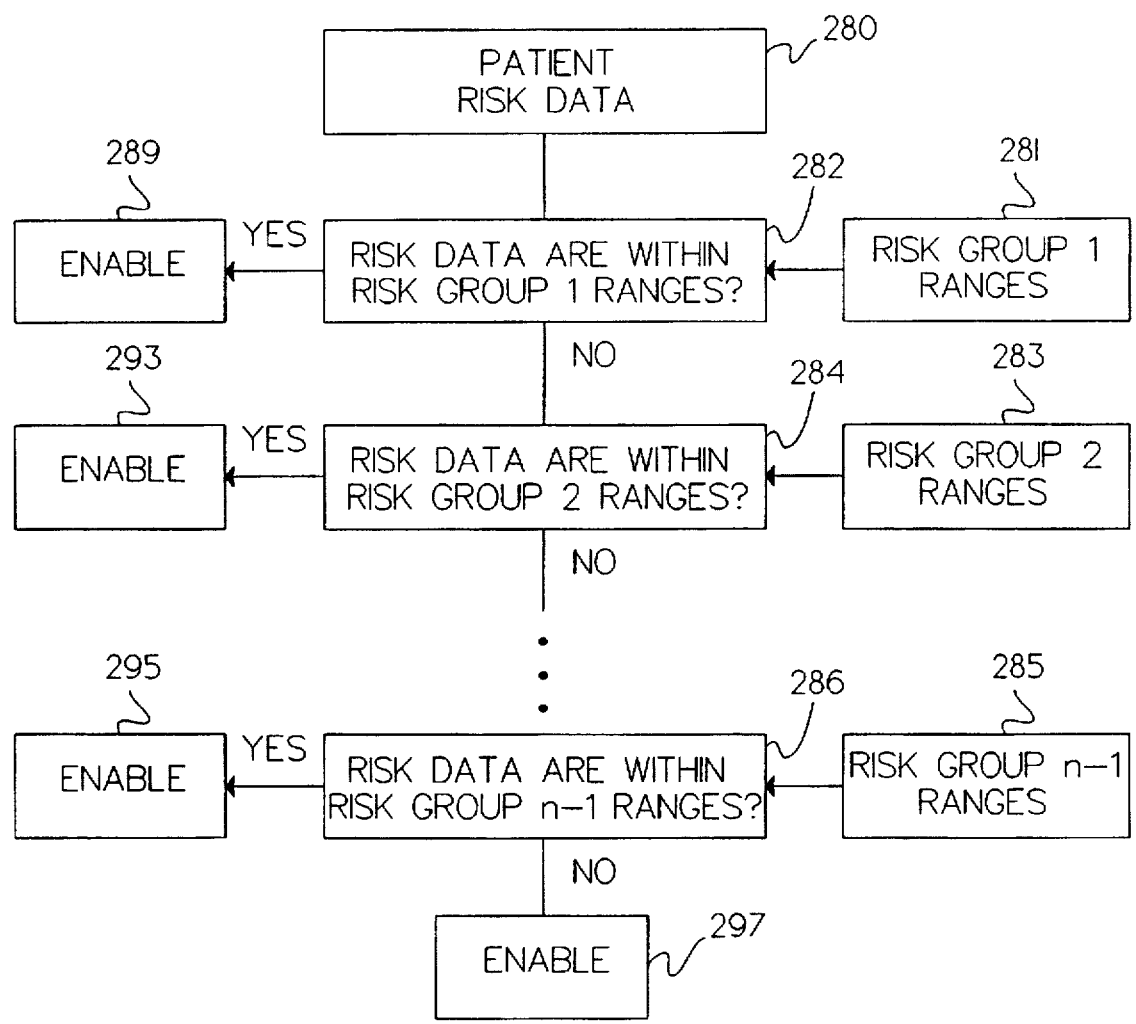

FIG. 16 shows a decision logic structure of one embodiment of the dispatcher of the invention.

Figure 17:
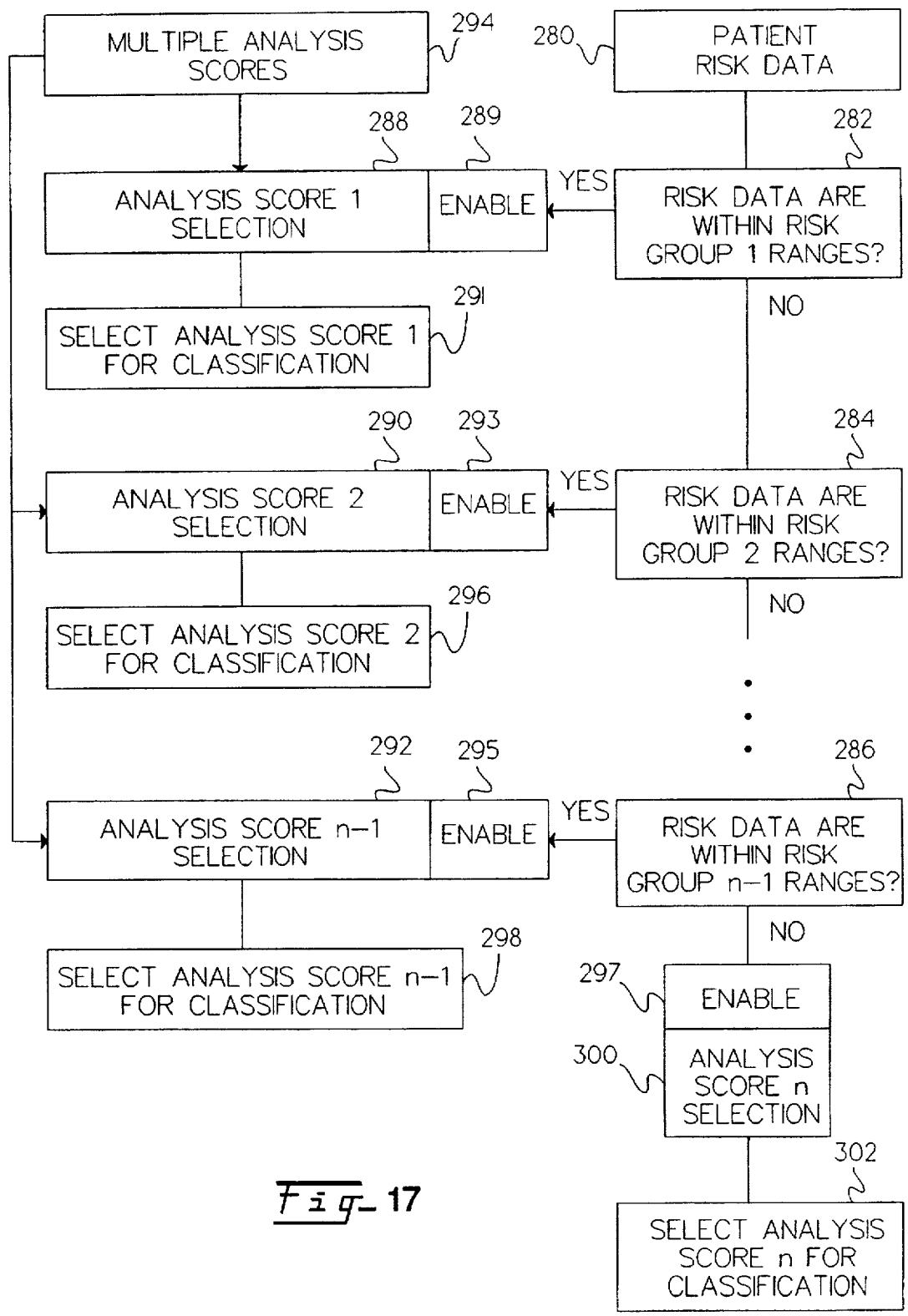

FIG. 17 shows the dispatcher used with multiple classifiers.

Figure 18:
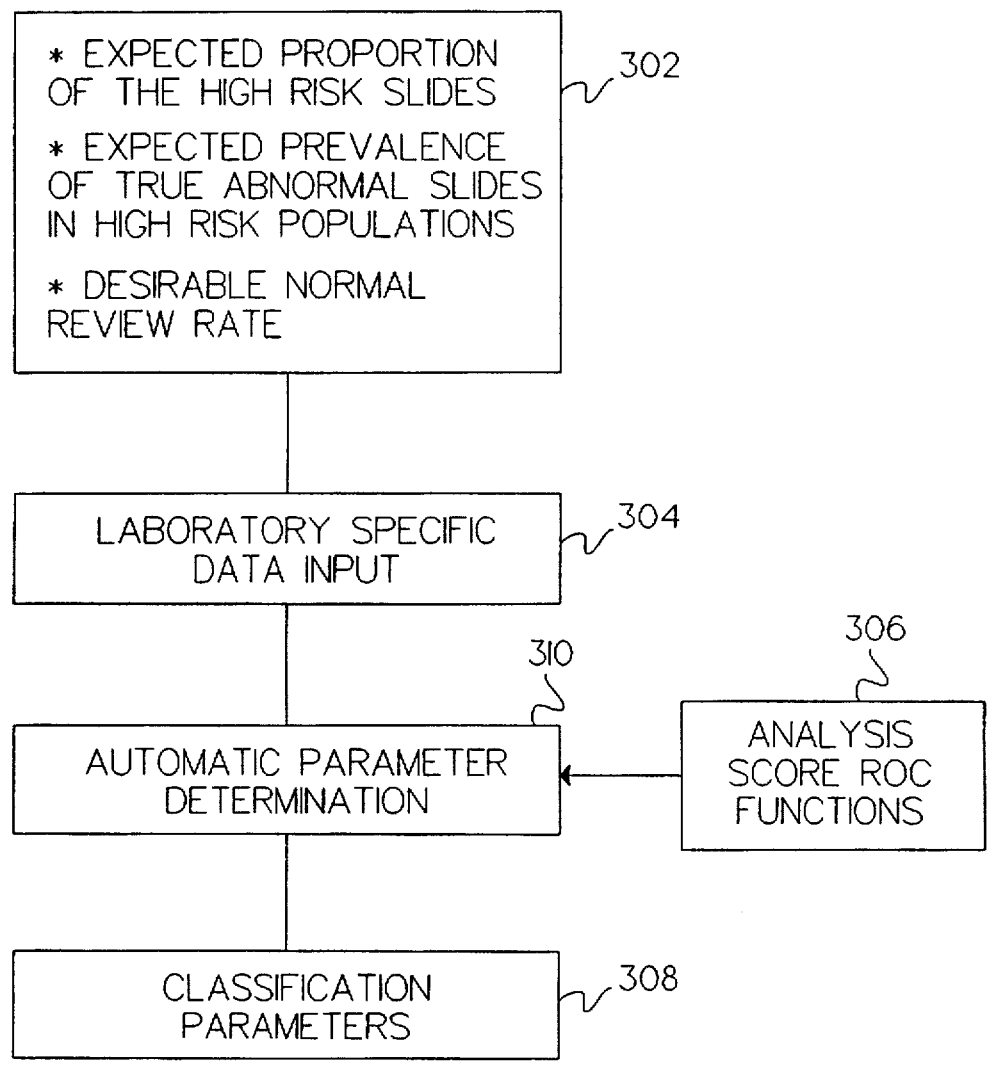

FIG. 18 shows an automatic classifier parameter determination.

Figure 19:
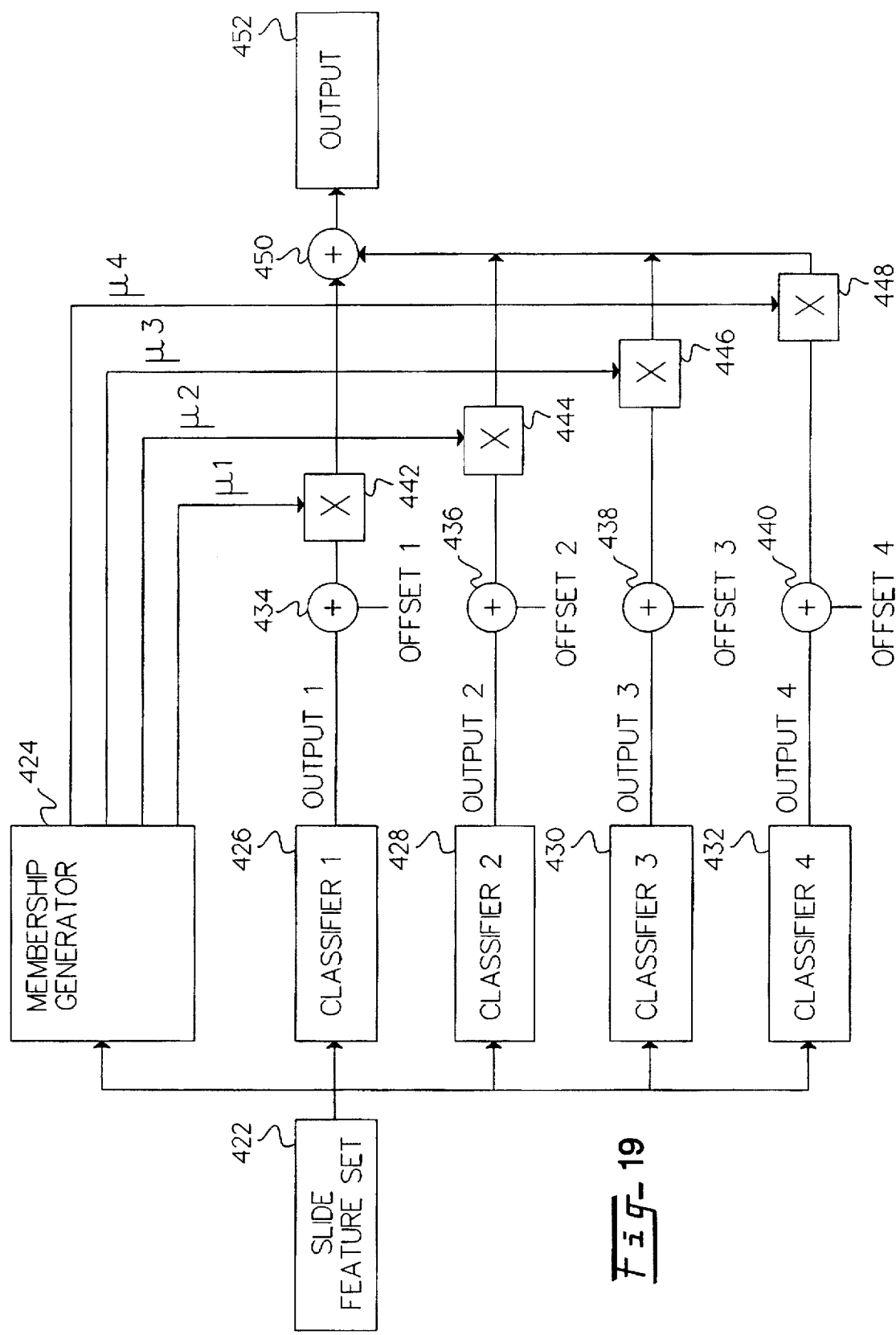

FIG. 19 shows a schematic diagram of an analysis score generator of the invention.

Figure 20:
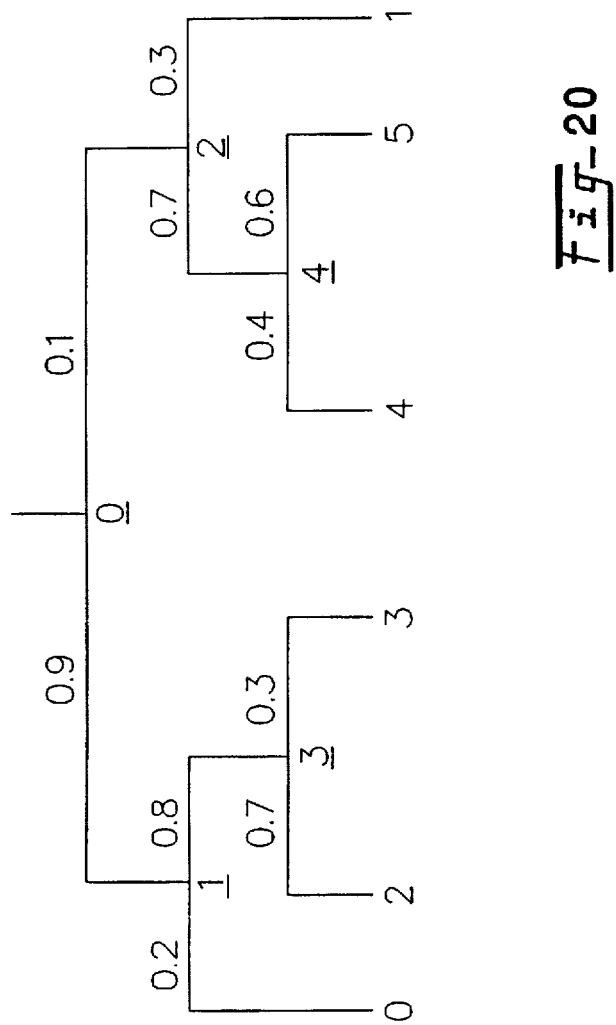

FIG. 20 is an example of a decision tree.

DETAILED DESCRIPTION OF THE PREFERRED EMBODIMENT

Figure 1A:
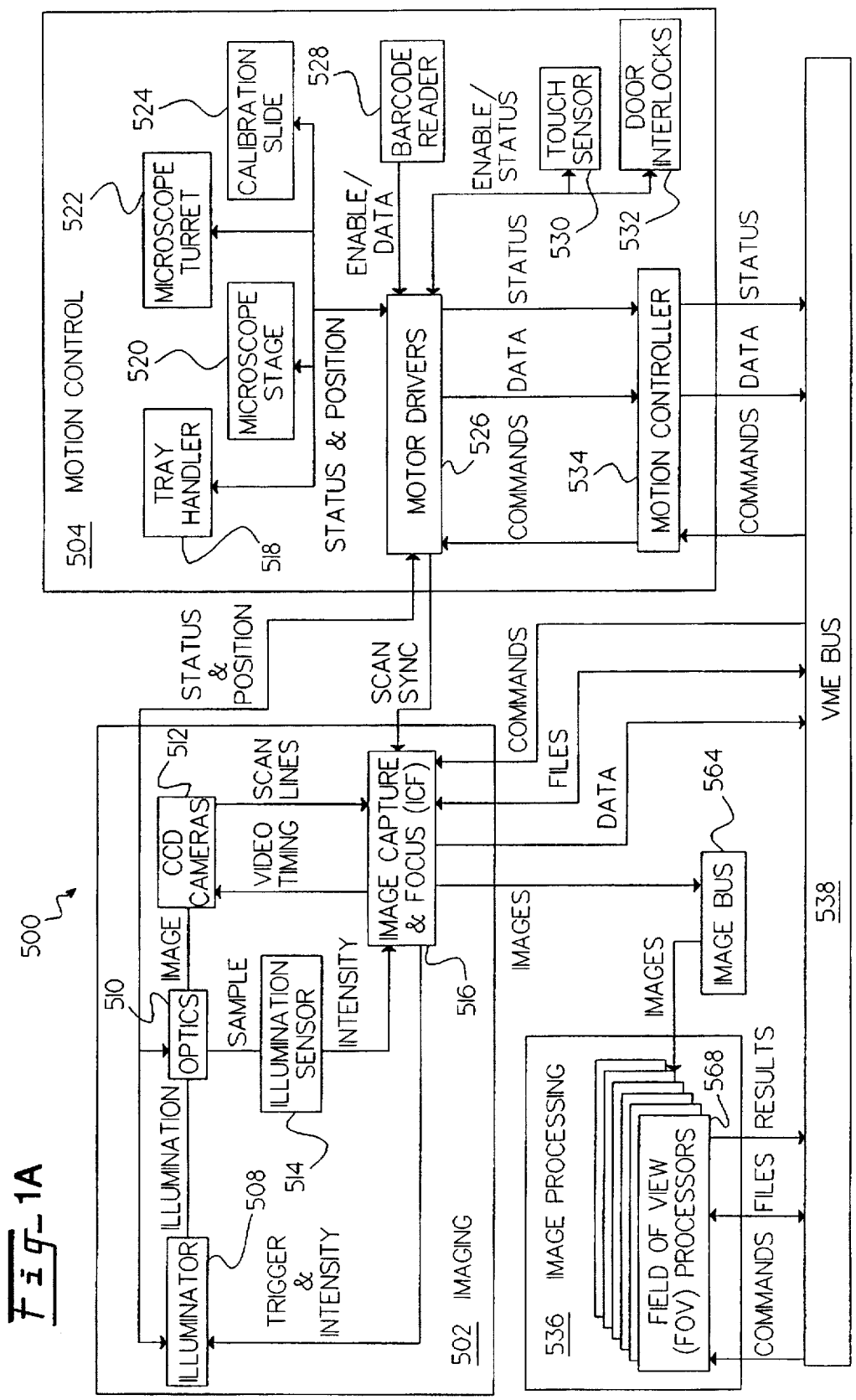
FIG. 1A shows a schematic block diagram of the apparatus of the invention.
Figure 1C:
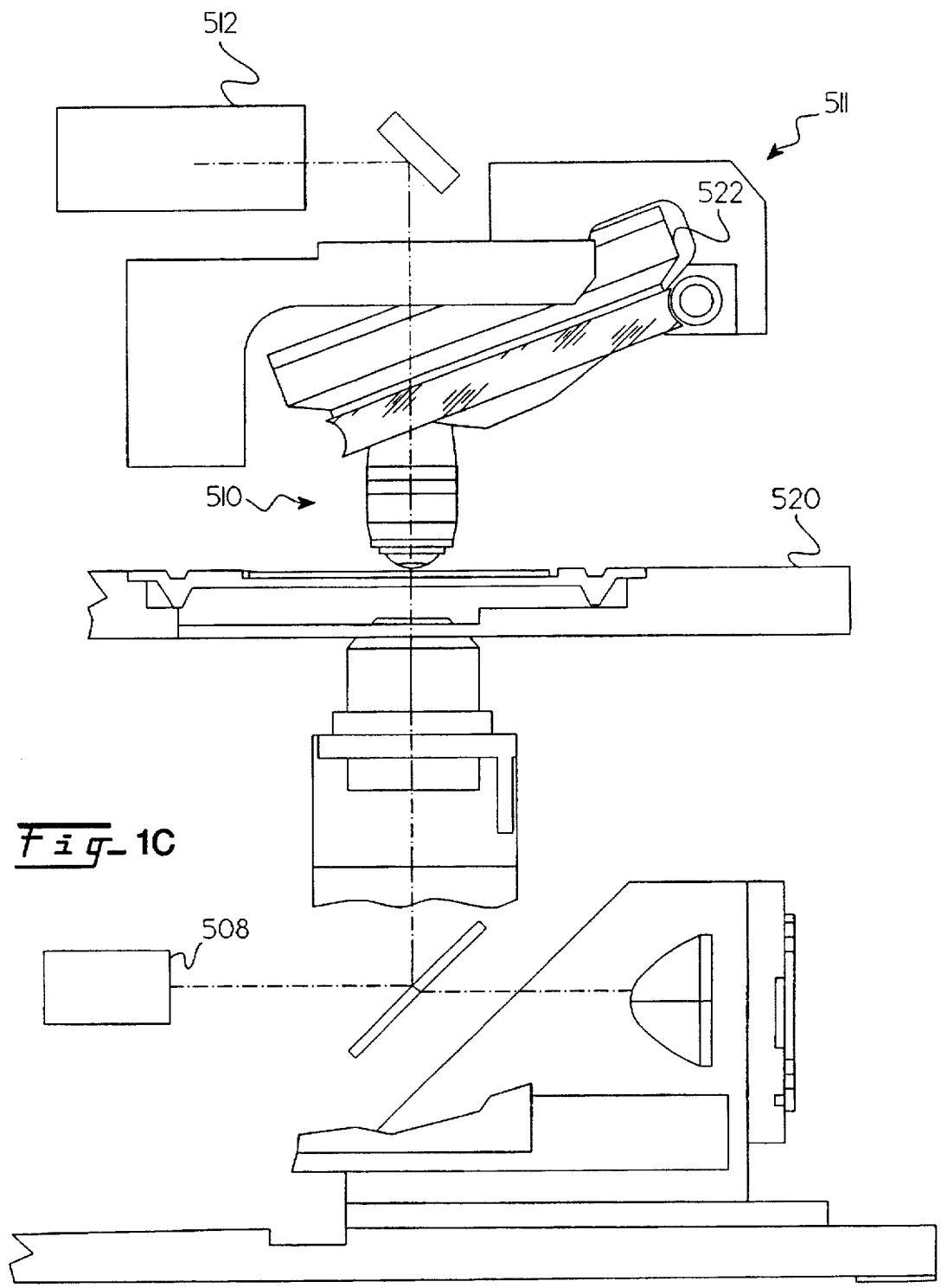
FIG. 1C shows a schematic diagram of the automated microscope of the invention.

Now refer to FIGS. 1A, 1B and 1C which show a schematic diagram of one embodiment of the apparatus of the invention for field of view prioritization. The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope 511. The illuminator 508 provides illumination of a portion of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a MOTOROLA 68030™ CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objective, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation 550. In one embodiment, workstation 550 may comprise a SUN SPARC CLASSIC™ workstation. A tape drive 546 is connected to the workstation 550 as well as a modem 548, a monitor 552, a keyboard 554, and a mouse pointing device 556. A printer 558 is connected to the Ethernet 560.

During slide classification, the central computer 540, running a real time operating system, controls the automated microscope and the processor to acquire and digitize images from the microscope. The flatness of the slide may be checked, for example, by contacting the four points on the slide coverslip using a computer controlled touch sensor. The computer 540 also controls the microscope stage to position the specimen under the microscope objective, and from one to 15 field of view (FOV) processors 568 which receive images under control of the computer 540.

4

In a presently preferred embodiment of the invention, the system disclosed herein is used in a system for analyzing cervical pap smears, such as that shown and disclosed in pending U.S. patent application Ser. No. 08/571,686, filed Dec. 13, 1995, which is a file wrapper continuation of U.S. patent application Ser. No. 07/838,064, filed Feb. 18, 1992, now abandoned, entitled "Method For Identifying Normal Biomedical Specimens", to Nelson et al.; U.S. Pat. No. 5,528,703 which is a continuation-in-part of abandoned U.S. patent application Ser. No. 07/838,395, entitled "Method For Identifying Objects Using Data Processing Techniques", issued to Lee, filed Feb. 18, 1992; U.S. patent application Ser. No. 07/838,070, now U.S. Pat. No. 5,315,700, entitled "Method And Apparatus For Rapidly Processing Data Sequences", by Richard S. Johnston, et al., filed Feb. 18, 1992; U.S. patent application Ser. No. 07/838,065, filed Feb. 18, 1992, now U.S. Pat. No. 5,361,140, entitled "Method and Apparatus for Dynamic Correction of Microscopic Image Signals" by Jon W. Hayenga et al.; and allowed U.S. patent application Ser. No. 08/302,355, filed Sep. 7, 1994 entitled "Method and Apparatus for Rapid Capture of Focused Microscopic Images" by Hayenga, et al., which is a continuation-in-part of application Ser. No. 07/838,063 filed Feb. 18, 1992, now abandoned, the disclosures of which are incorporated herein, in their entirety, by the foregoing references thereto.

The present invention is also related to biological and cytological systems as described in the following patent applications which are assigned to the same assignee as the present invention, filed on Sep. 20, 1994, and which are all hereby incorporated by reference including pending U.S. patent application Ser. No. 08/309,061, to Wilhelm et al., entitled "Apparatus for Automated Identification of Cell Groupings on a Biological Specimen," pending U.S. patent application Ser. No. 08/309,116, to Meyer et al. entitled "Apparatus for Automated Identification of Thick Cell Groupings On a Biological Specimen," pending U.S. patent application Ser. No. 08/667,292, filed Jun. 20, 1996, which is a file wrapper continuation of U.S. patent application 08/309,115, filed Sep. 20, 1994, now abandoned, to Lee et al. entitled "Biological Analysis System Self Calibration Apparatus," pending U.S. patent application Ser. No. 08/678,124 filed Jul. 11, 1996 which is a file wrapper continuation of U.S. patent application Ser. No. 08/308,992, filed Sep. 20, 1994, now abandoned, to Lee et al. entitled "Apparatus for Identification and Integration of Multiple Cell Patterns," U.S. patent application Ser. No. 08/309,063, now U.S. Pat. No. 5,627,908, issued May 6, 1997 to Lee et al. entitled "A Method for Cytological System Dynamic Normalization," U.S. patent application Ser. No. 08/309,248, now U.S. Pat. No. 5,638,459, issued Jun. 10, 1997 to Rosenlof et al. entitled "Method and Apparatus for Detecting a Microscope Slide Coverslip," U.S. patent application Ser. No. 08/309,077, now U.S. Pat. No. 5,566,249, issued Oct. 15, 1996 to Rosenlof et al. entitled "Apparatus for Detecting Bubbles in Coverslip Adhesive," pending U.S. patent application Ser. No. 08/309,931, to Lee et al. entitled "Cytological Slide Scoring Apparatus," U.S. patent application Ser. No. 08/309,148, for which the issue fee has been paid, to Lee et al. entitled "Method and Apparatus for Image Plane Modulation Pattern Recognition," pending U.S. patent application Ser. No. 08/309,250, to Lee et al. entitled "Apparatus for the Identification of Free-Lying Cells," pending U.S. patent application Ser. No. 08/309,209, to Oh et al. entitled "A Method and Apparatus for Robust Biological Specimen Classification," pending U.S. patent application Ser. No. 08/309,117, to Wilhelm et al., entitled "Method and Apparatus for Detection of Unsuitable Conditions for Automated Cytology Scoring."

Figure 2:
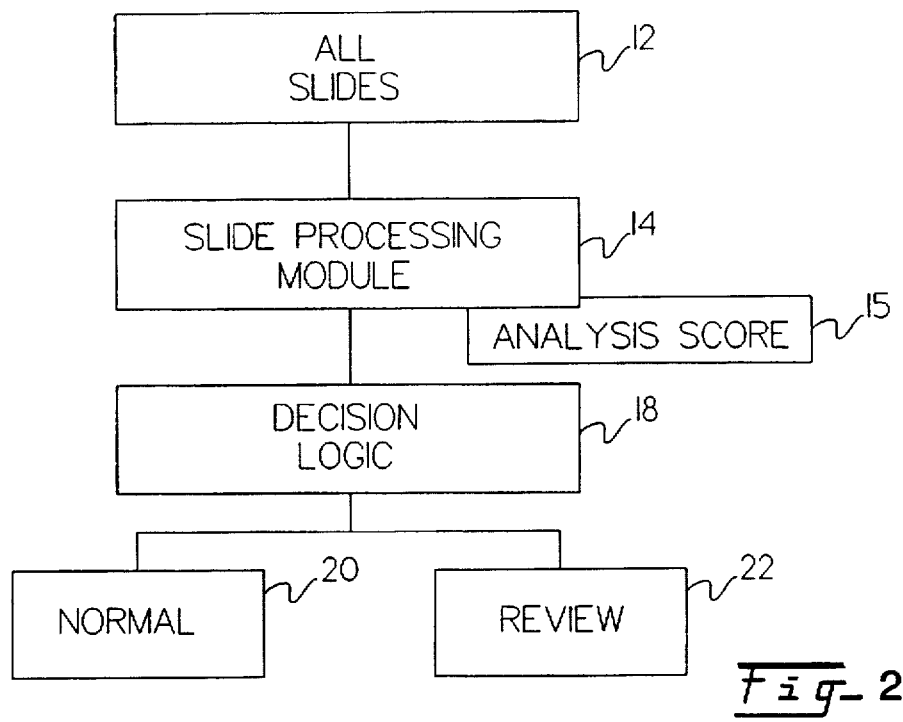
FIG. 2 shows a process flow diagram for processing slides into a normal category or a review category.

Refer now to FIG. 2 which shows one slide scoring method of the invention. A biological specimen 12, such as a Pap smear, is loaded into a slide processing system 14, one example of which is shown in FIGS. 1A, 1B and 1C. The system 14 processes the slide 12 and generates one or multiple analysis scores 15. In one preferred embodiment of the invention, an analysis score 15 can be generated by the method disclosed in pending U.S. patent application entitled "Method for Identifying Normal Biomedical Specimens" to Nelson et al. filed Dec. 13, 1995 under pending application Ser. No. 08/571,686 which is a file wrapper continuation of U.S. patent application Ser. No. 07/838,064, now abandoned. The analysis score 15 is then thresholded 18. The slides having an analysis score less than the normal threshold are classified as normal slides 20 which can be reported as normal without human intervention. The slides having an analysis score greater than or equal to the normal threshold are the potentially abnormal slides 22. These slides require an independent review by a human. The decision logic is:

```
IF analysis score < normal threshold THEN
    classified as normal
OTHERWISE
    requires review
ENDIF
```

The accuracy of an analysis score can be characterized by abnormal detection sensitivity and normal specificity. The abnormal detection sensitivity is defined as the probability that an abnormal slide is called review by the classifier and the normal specificity is defined as the probability that a normal slide is called normal by the classifier. Specificity is also referred to as the normal sort rate.

Figure 3:
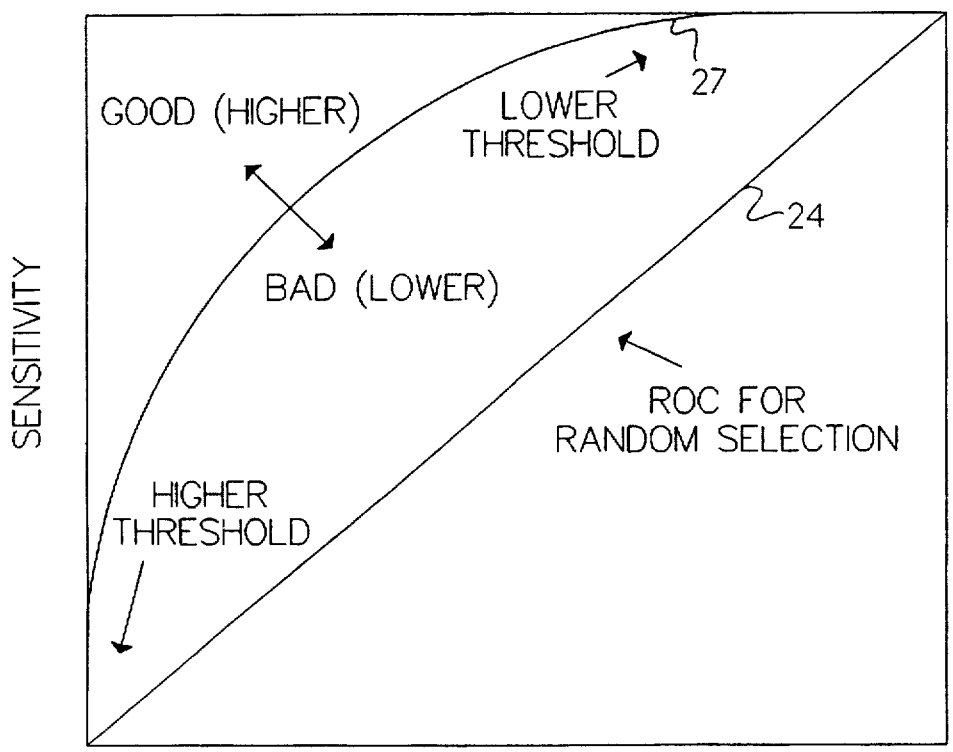
FIG. 3 shows a receiver operating characteristics curve.

Refer now to FIG. 3 which shows a sensitivity vs. 1-specificity plot. The sensitivity and the specificity can be adjusted by varying the normal threshold. When changing the threshold, the sensitivity and the specificity vary inversely. If the threshold is changed over a wide range, then a variety of (sensitivity, specificity) pairs is generated, which can be plotted as a set of points in a unit square. If the threshold is varied continuously, a smooth curve 27 would be swept out. A particular form of this diagram is called a Receiver Operating Characteristics (ROC) curve. Each ROC curve indicates the tradeoffs between sensitivity and specificity that are available from an analysis score, and thus describes the inherent discrimination capacity of the score. The particular normal threshold employed determines the particular "operating point," the combination of sensitivity and specificity. Conventionally, an ROC curve plots sensitivity as a function of False Positive Fraction (i.e., 1-specificity).

A typical ROC curve is shown in FIG. 3. A "higher" ROC would indicate greater discrimination capacity, because a higher sensitivity at each value of specificity—or, equivalently, a higher value of specificity at each value of sensitivity—can be achieved on a higher curve if an appropriate threshold is used. Similarly, a lower ROC would indicate less discrimination capacity. The discrimination curve for random selection is a diagonal 24.

In this invention, multiple analysis scores are developed for each slide, each analysis score is designed to work well in a particular sensitivity and specificity operating range of the system. In a preferred embodiment of the invention, three analysis scores are generated: a low-sort score, a mid-sort score, and a high-sort score. The low-sort score is designed to operate well at a specificity range of 15–35%. The mid-sort score is designed to operate well at a specificity range of 40–60% and the high-sort score is designed to operate well at a specificity range of 70–95%. Each score yields the highest sensitivity within its specificity operating range. An ROC curve can be generated for each score. Note that the low-sort score will have the highest ROC curve within the low specificity range; the mid-sort score will have the highest ROC curve within the medium specificity range; and the high-sort score will have the highest ROC curve within the high specificity range. The exact operating point of each score can be fine tuned within the operating range by adjusting the normal threshold for that score.

In a typical cytology lab, cases can be sorted into at least one high risk population and low risk population based on the case history and other clinical information. A case in a high risk population either has previous positive detection or has symptoms suggesting the possibility of a disease state. The cases in the high risk population are more likely to be abnormal than the remaining population. In the fully manual operation, all cases are reviewed by a human screener. If a case is determined to be suspicious, it is usually passed to a senior cytotechnologist for confirmation and the confirmed cases will be sent to a cytopathologist for final confirmation and diagnosis assignment. In the screening process, special attention is normally applied to the high risk cases to improve the sensitivity to disease.

When the invention is operated in the quality control screening mode, some cases within normal limits at the initial screening will be selected and independently rescreened by a senior cytotechnologist. If a case is determined to be suspicious, it is passed to a cytopathologist for discrepant resolution and final diagnosis assignment. The method for selecting slides for quality control rescreening includes a random component and directed component. The random component comprises slides randomly selected from the set of slides found to be within normal limits. The directed review component comprises slides from high risk cases determined on the basis of case history and clinical information as well as cases determined to be ambiguous during the initial screening process.

Figure 4:
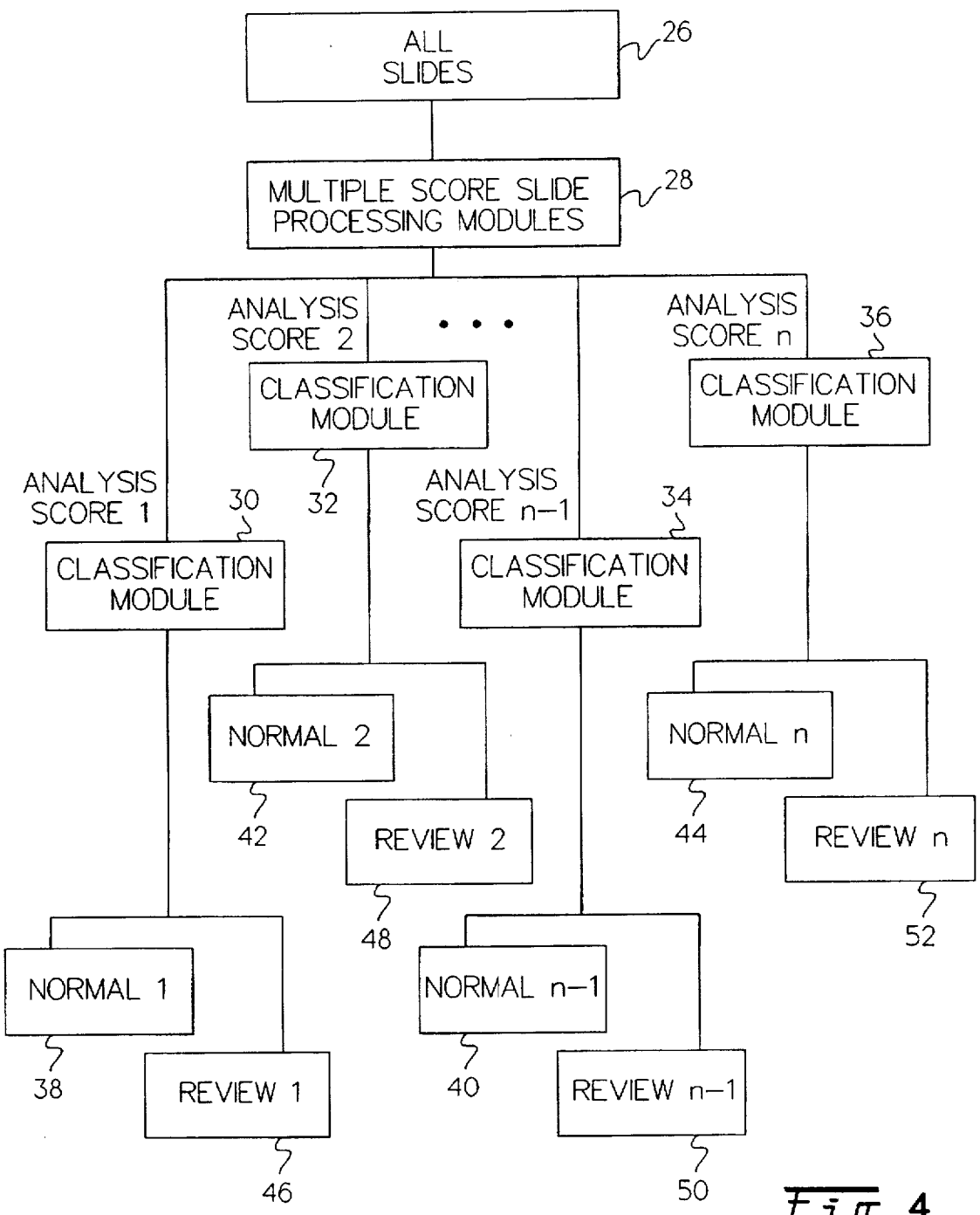
FIG. 4 shows a multiple slide score classifier.

Now refer to FIG. 4 which shows an apparatus and method for processing slides having a predetermined number of classification modules. In step 26, all slides are processed by a slide analysis processing module 28. The processing module is shown in more detail in FIGS. 1A, 1B and 1C. The processing module generates a predetermined number of scores: analysis score$_1$, analysis score$_2$ . . . , analysis score$_{n-1}$, and analysis score$_n$. Analysis score$_1$, is sent to classification module 30. Likewise, classification module 32 receives analysis score$_2$. Analysis score$_{n-1}$ is used by classification module 34 and analysis score$_n$ is used by classification module 36. Classification module structures are shown in more detail below with reference to FIG. 5. Multiple score processing module 28 is shown in more detail with reference to FIG. 7. Each classification module sorts slides 26 into either a normal category or a review category. The normal category indicates that the slide is normal and, similarly, the review category 38, 42, 40, or 44 indicates that the slide should be reviewed. These classifications are available from all classification modules 30, 32, 34 and 36. In general these two classifications are available for all classification modules 30, 32, 34 and 36 utilized in any particular embodiment.

Figure 5:
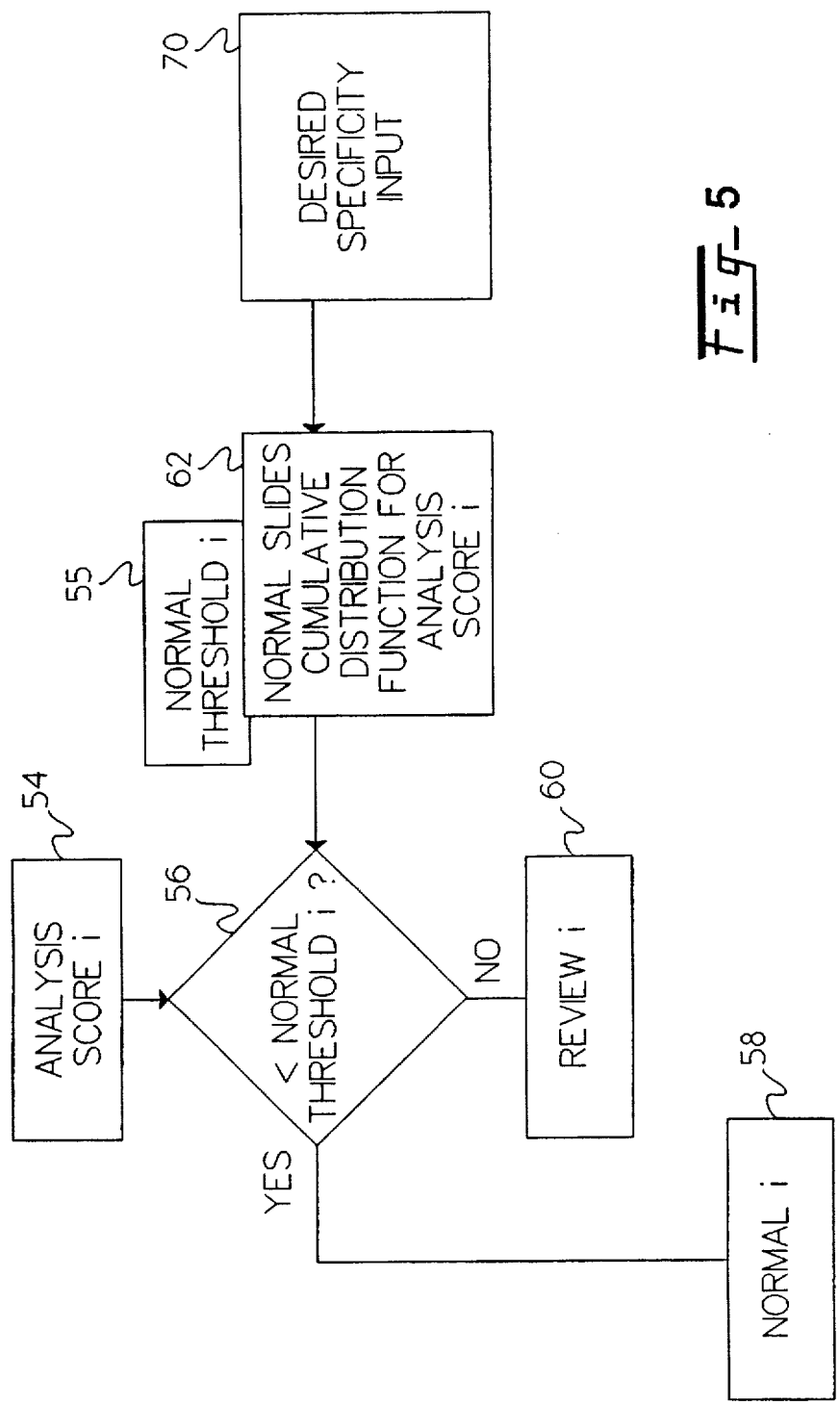
FIG. 5 shows an analysis score classification system.

Refer now to FIG. 5 which shows an analysis score classification module of the invention. An analysis score 54 is thresholded by a normal threshold at step 56. If the normal threshold is exceeded, the slide is sent for review at step 60. If the threshold is less than the normal threshold, the slide is considered to be normal at step 58. The normal threshold 55 is a result of an analysis called cumulative distribution function analysis for an analysis score$_i$. The cumulative distribution function 62 has as its input a desired specificity 70. The output of the cumulative distribution function analysis is a normal threshold 55 used by step 56 to determine whether an analysis score indicates a normal slide 58 or that the slide should be sent for review 60.

Figure 7:
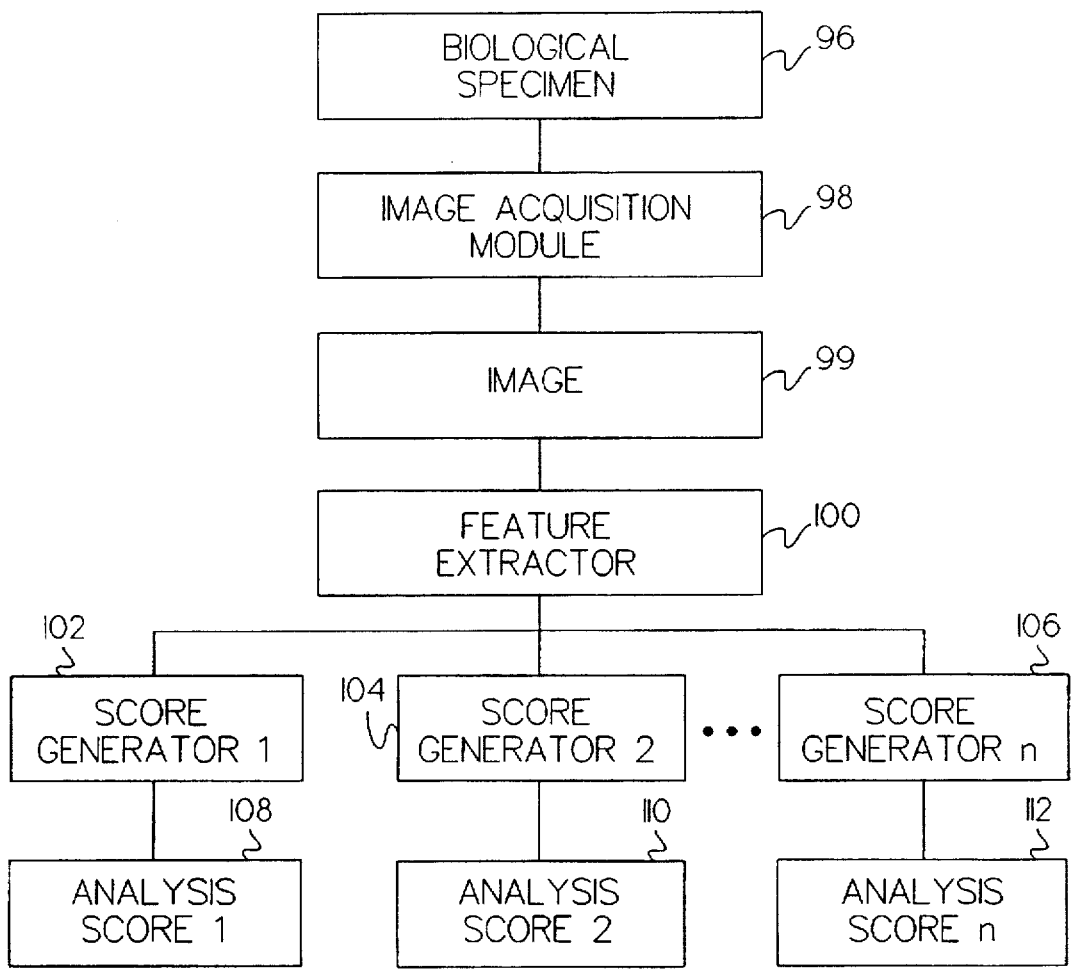
FIG. 7 shows a multiple score slide processing system.

Now refer to FIG. 7 which shows the multiple scores slide processing of the invention. A biological specimen 96 is received by an image acquisition module 98 to acquire image 99. The image 99 is sent to a feature extractor 100. The feature extractor generates features for a score generator. More than one score generator is shown including score generator$^1$ 102, score generator$^2$ 104 and score generator 106. Any number of score generators may be used to generate analysis scores that correspond to certain feature sets from the feature extractor 100. An analysis score$_n$ 108, analysis score$_2$ 110 and analysis screen 112 are provided, each represents the result of a predetermined classification criteria.

Figure 6:
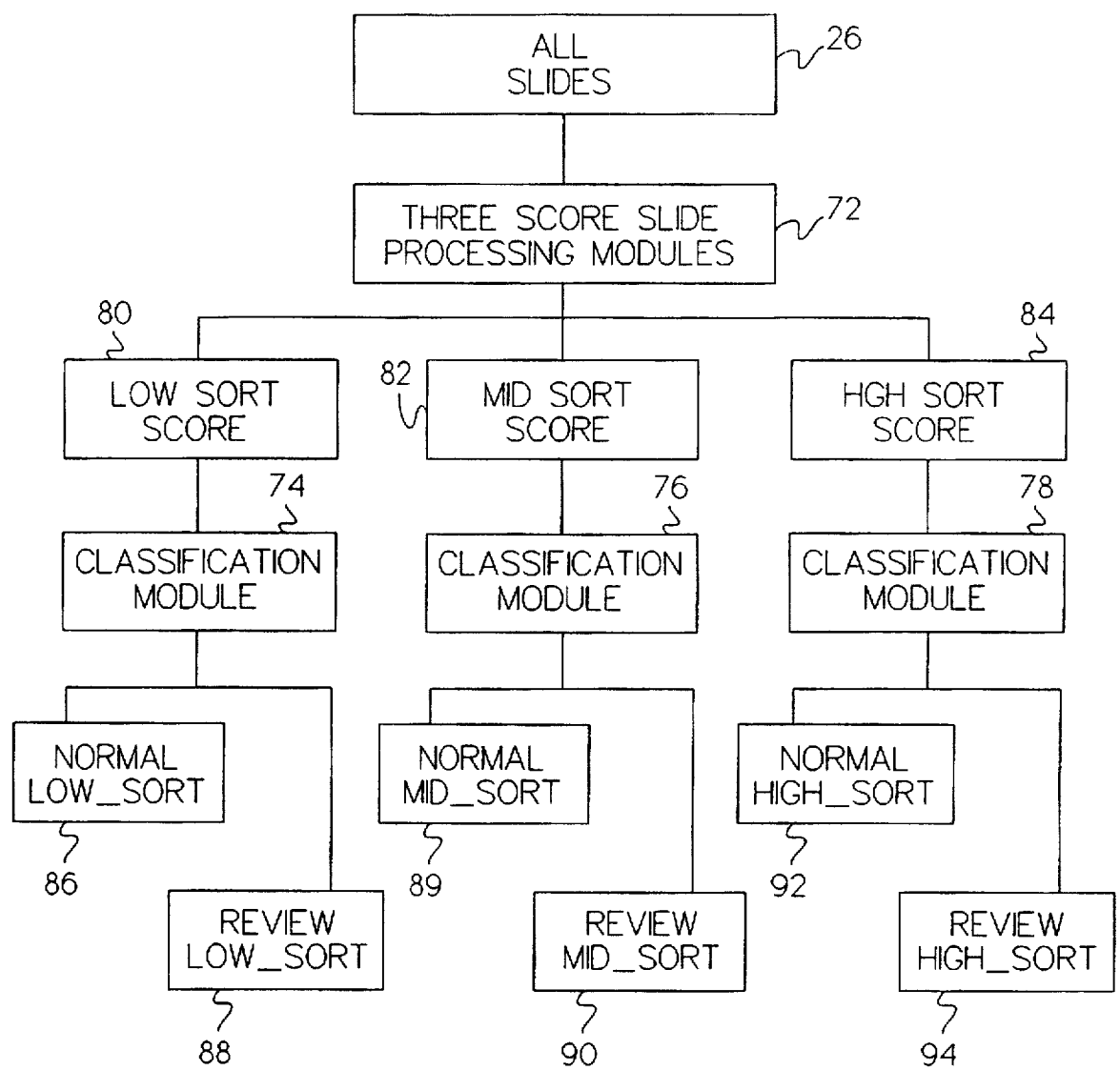
FIG. 6 shows one implementation of a three score slide processor and classifier.

Now refer to FIG. 6 which shows one embodiment of the invention implementing a three score slide processing classification system. All the slides in the group of slides to be scored are provided to a three score slide processing module 72. The three score slide processing module 72 generates a low-sort score 80, a mid-sort score 82 and a high-sort score 84. The low-sort score 80 is used by classification module 74. The mid-sort score is used by classification module 76. The high-sort score 84 is used by classification module 78. Classification module 74 outputs a decision indicating that the slide is normal 86 or needs review 88. Slide classification module 76 determines normal 89 and review 90 categories for the mid-sort score. Likewise, the high-sort score slide classification module 78 outputs a normal decision 92 or a re view decision 94.

The objective of the computer-aided screening methods of the invention are to achieve as high a sensitivity as possible given a reasonable human review workload. To achieve this goal, the automated screening system employs the low-sort, mid-sort and high-sort capabilities. By configuring the automated system in a highly efficient fashion with proper adjustment to use a priori knowledge of patient history in the context of the lab work flow, the above objective can be is achieved.

Figure 8:
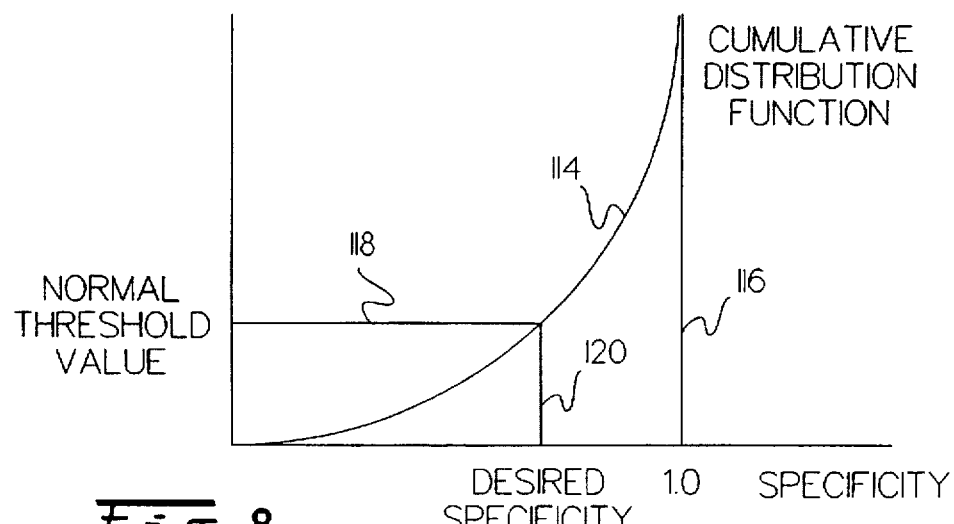
FIG. 8 shows a curve of analysis score vs. specificity of a cumulative distribution function.

Now referring to FIG. 8, a plot of the normal threshold value determination based on a cumulative distribution function is shown. The normal threshold 118 may be obtained by selecting the desired specificity 120 and intersecting the cumulative distribution function curve 114 for the particular normal threshold value 118. Those skilled in the art will recognize that each desired specificity has an associated normal threshold value. The cumulative distribution function achieves the highest normal threshold value at unity specificity 116.

Figure 9:
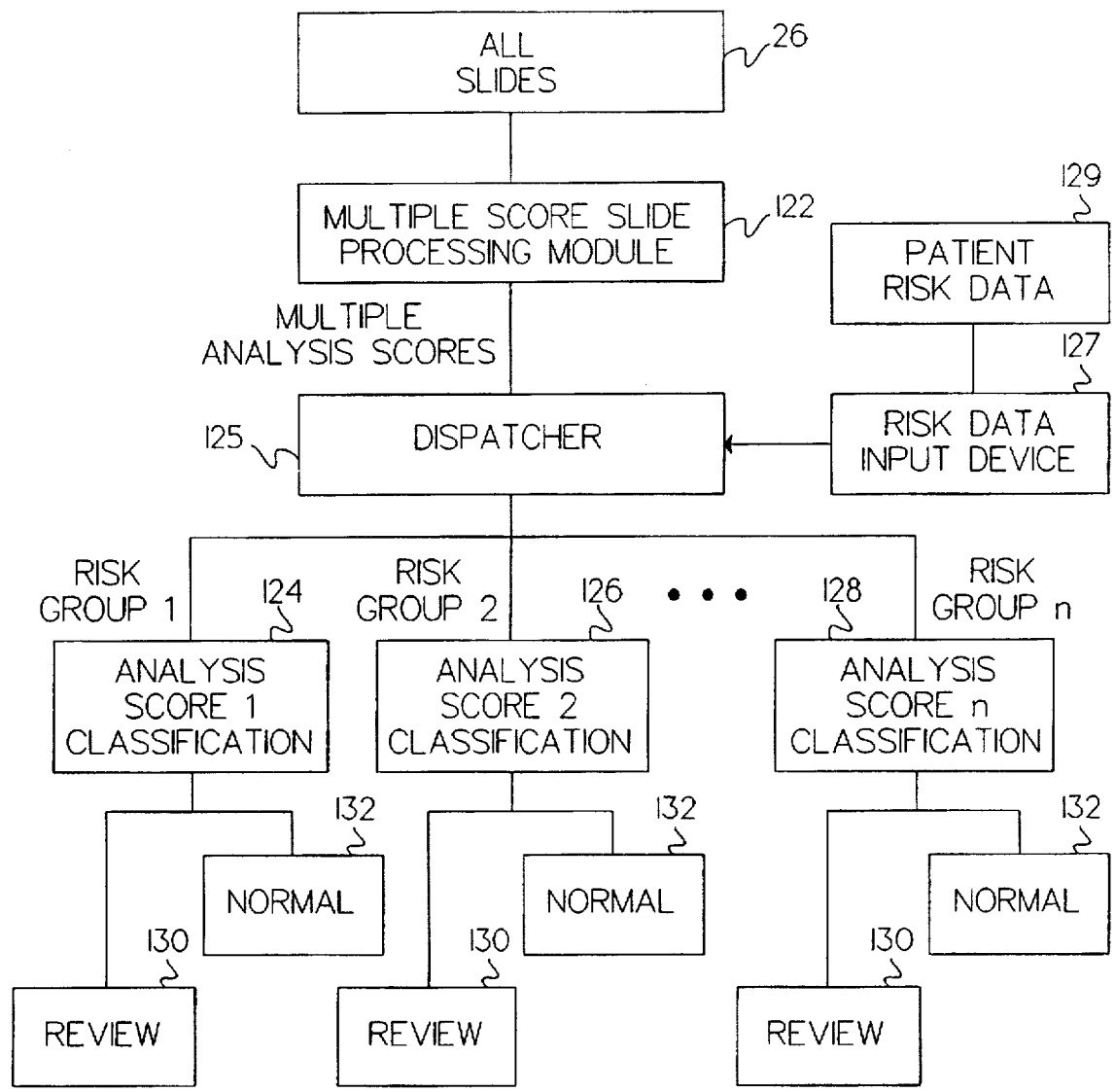
FIG. 9 shows a primary screening apparatus showing multiple score slide processing sorting and classification.

Now referring to FIG. 9 which shows the method of the invention used to provide primary screening for biological slide processing. All slides 26 are processed by multiple score slide processing module 122. A dispatcher 125 accepts risk data 127 from patient risk data 129. The patient risk data is a historical compilation of the risk profile of a patient including, for example, age, previous health history, physician requests, prior diagnoses and other factors. Dispatcher 125 assigns analysis score classifications based on the risk data input. The slide may be classified by analysis score 1 classification 124, analysis score 2 classification 126, and any number of analysis score n classifications 128. Each analysis score classification classifies slides into a review decision 130 and a normal decision 132. The dispatcher is shown in more detail in FIG. 17.

Figure 10:
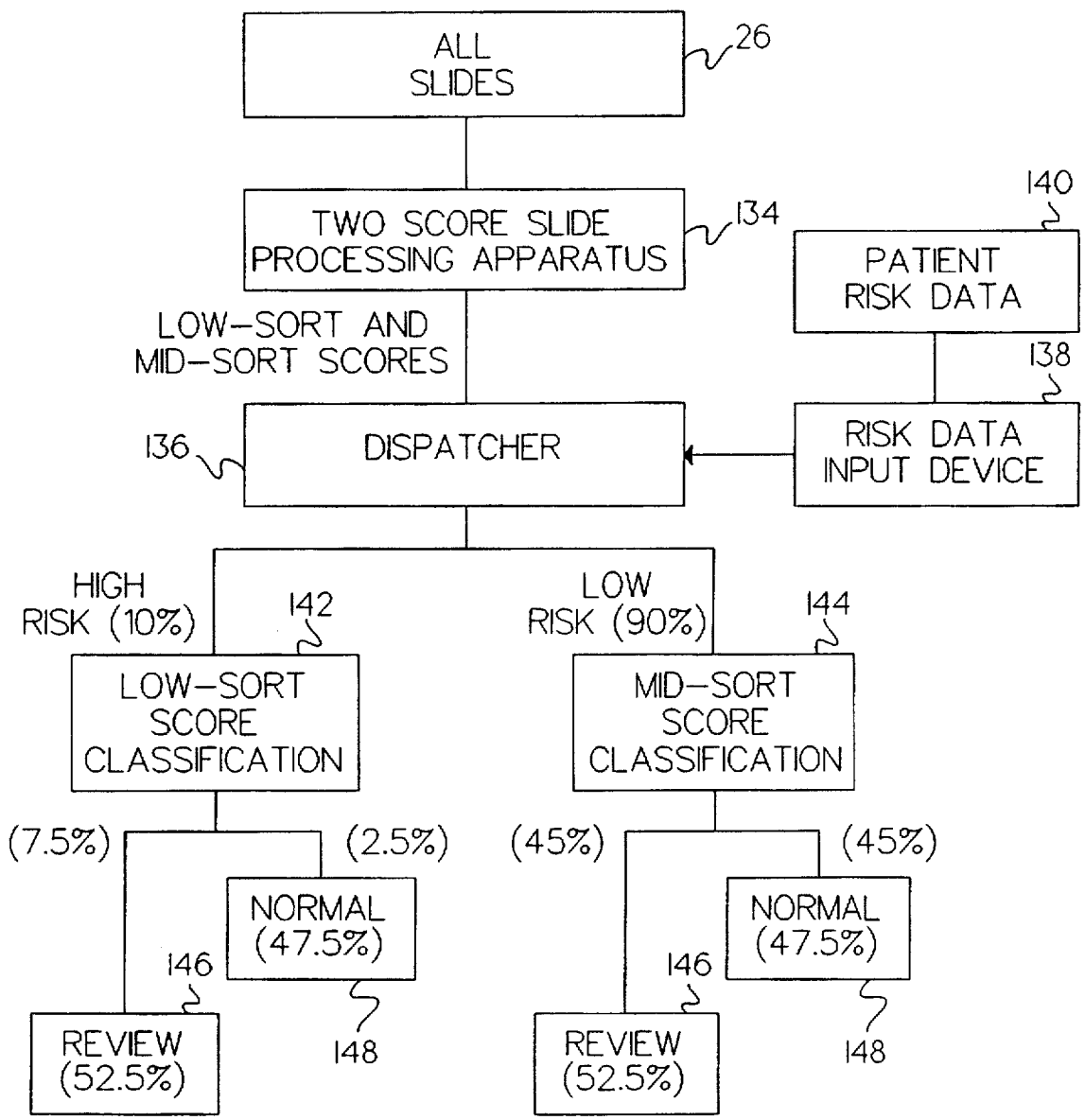
FIG. 10 shows a primary screening apparatus for a two score slide processing sorting and classification.

Now referring to FIG. 10 which shows a two score slide processing and sorting classification system. All slides 26 are processed by a two score slide processing apparatus 134. A two score dispatcher 136 receives risk data input 138 from patient risk data 140. The two score dispatcher 136 is designed to provide high risk and low risk classifications. The two score dispatcher 136 assigns each slide to only one classifier at a time. The high risk classifications are done in a low-sort score classification 142 and the low-risk classification is done at mid-score classifier 144. The classifiers are designed to classify a certain percentage of slides as review 146 or normal 148. In FIG. 10, 45% of the mid-sort score classification is assigned a review and 7.5% of the low-sort score classification is sent for review. In FIG. 10, 45% of the mid-sort score classification is considered normal and 2.5% of the low-sort score classification is considered normal. The total adds to 100% of the slides. This assumes at least 50% of the truly abnormal slides are included in the high risk population, which accounts for only 10% of the overall population. The other 50% of the truly abnormal slides are included in the remaining 90% of the overall slide population. It assumes the sensitivity of the low-sort classification is 100%, and the specificity of the low-sort score is 25%. It assumes the sensitivity of the mid-sort classification is 95%, the specificity of the mid-sort score is 50%. If all slides are processed by the mid-sort score algorithm alone, the overall specificity will be 50% and the sensitivity will be 95%. However, based on the strategy described above, the overall specificity will be 47.5% and the sensitivity will be 50%+0.95*50%=97.5%. The abnormal false negative rate (1-sensitivity) can be reduced by half with a minor decrease of the normal specificity.

Figure 11:
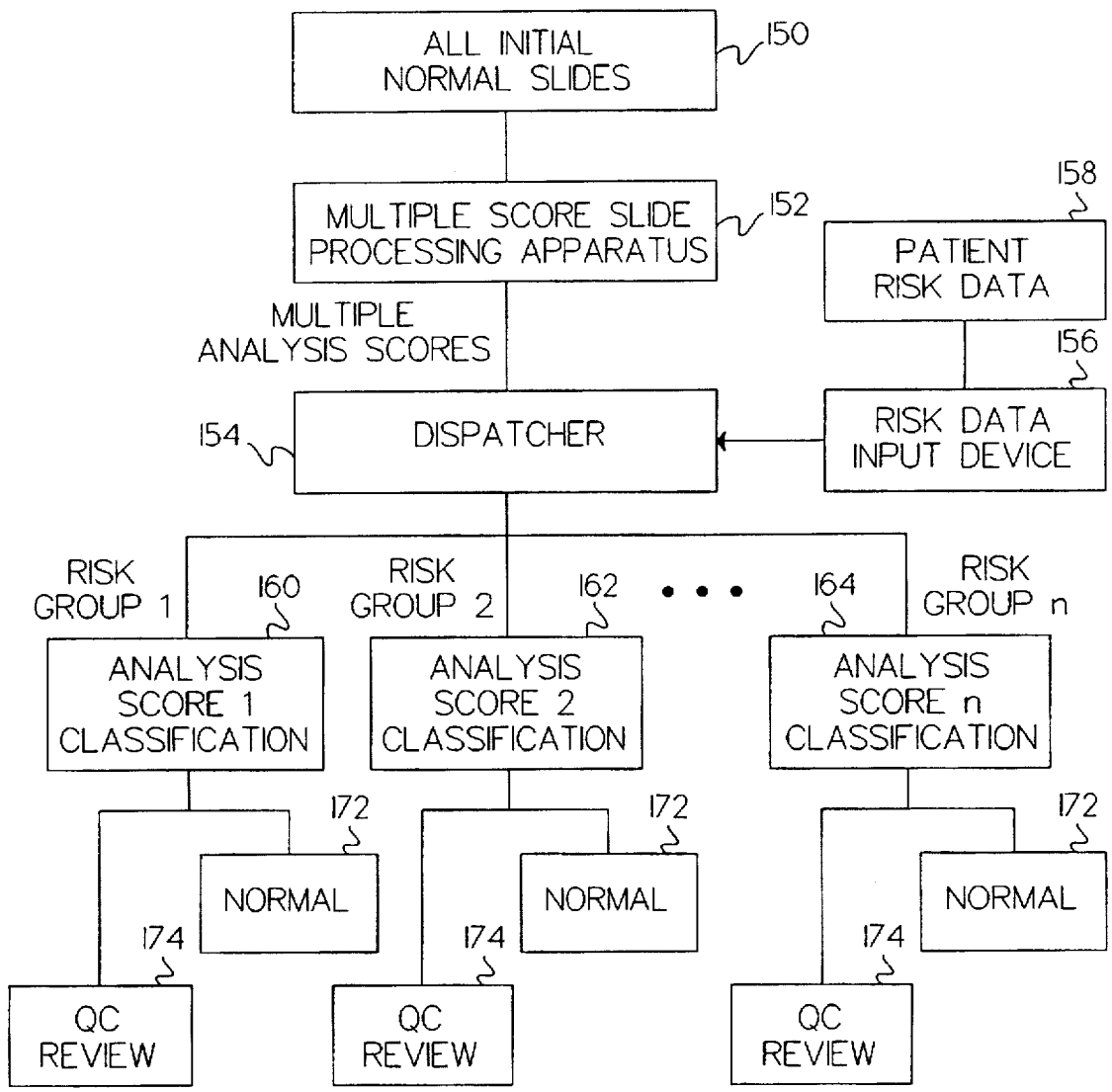
FIG. 11 shows a quality control screening apparatus having multiple score slide processing sorting and classification.

Now refer to FIG. 11 which shows the processing of a quality control screening apparatus. All slides initially determined to be normal 150 are processed by a multiple score slide processing apparatus 152. Dispatcher 154 assigns slides based on a predetermined number of risk groups selected by risk input data 156 from patient risk data 158. Analysis score classifications 160, 162, and 164 are enabled from dispatcher 154 based on the risk input data 158. A certain number of the slides are sent for QC review in step 174. A certain percentage of the slides are determined to be normal in step 172.

Figure 12:
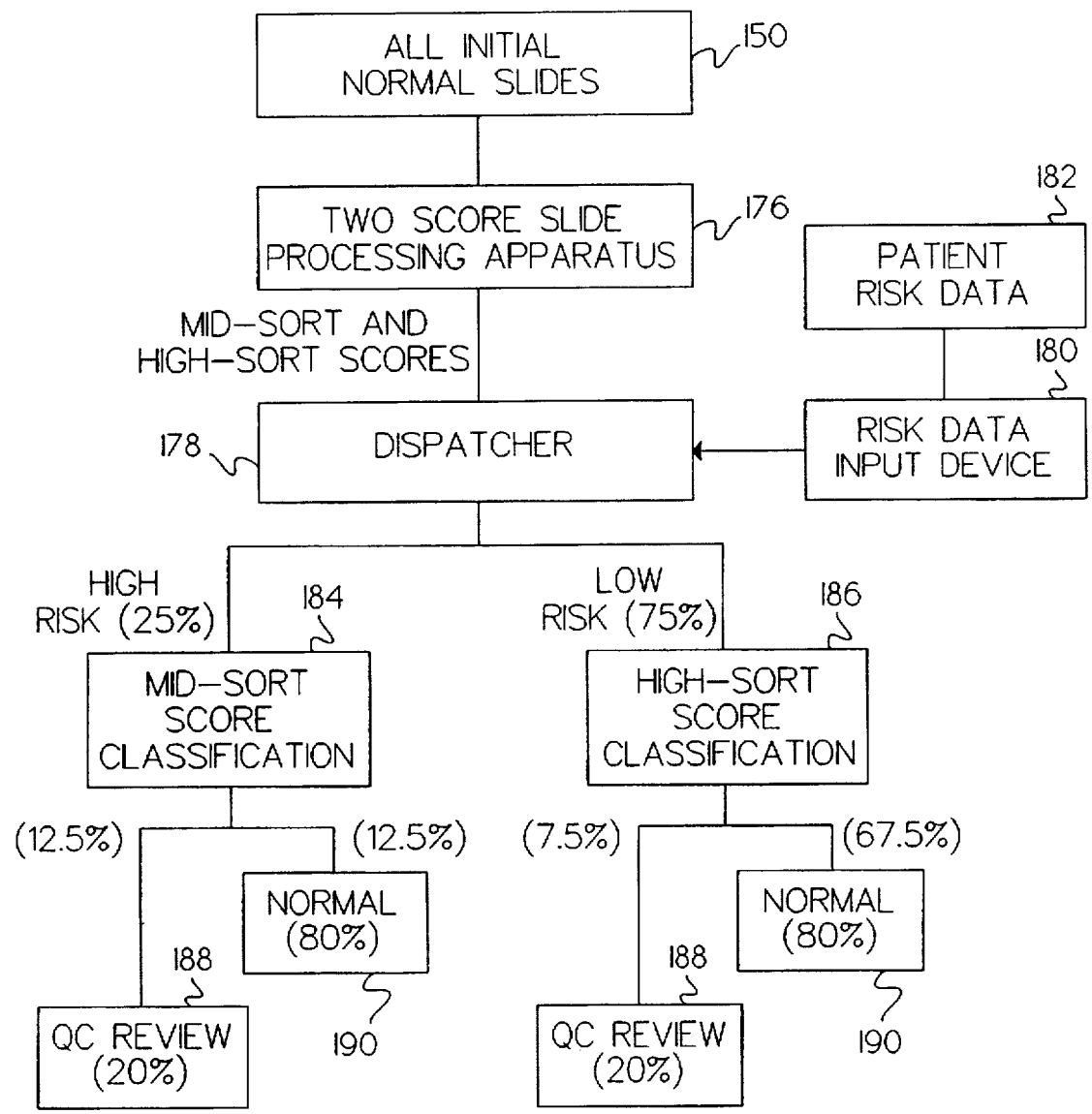
FIG. 12 shows a primary screening apparatus having two score slide processing sorting and classification.

Now refer to FIG. 12 which shows an embodiment of the quality control screening apparatus for a two score slide processing sorting and classification system. All slides initially classified as normal 150 are processed by a two score slide processing apparatus 176. Two score slide processing apparatus dispatcher 178 is used to determine high risk and low risk slides. Risk data 180 from patient risk data 182 is input to the dispatcher 178. The dispatcher sends a certain percentage of the slides determined as high risk for mid-sort score classification 184 and a certain percentage of the slides determined as low risk for high-sort score classification 186. The high risk cases are classified on the basis of a mid-sort score which has reasonably high abnormal detection sensitivity. The remaining cases are classified on the basis of a high-sort score which has higher specificity yet its abnormal detention sensitivity is lower than the mid-sort score. The high risk slides designated for review by the mid-sort score and the remaining slides designated for review 188 by the high-sort score will be QC reviewed by a human and the slides called normal 190 will be signed off without additional QC review.

A simplified example may be used to illustrate the performance of this system. For this example, a population characteristic must be assumed. Assume 50% of the initially missed abnormal slides are included in the high risk population. Assume the high risk population accounts for only 25% of the initial normal slide population. The 50% of the initially missed abnormal slides are included in the remaining 75% of the initial normal slide population.

Now assume, for this example, the following machine characteristics; including, the sensitivity of the mid-sort classification is 95% and the specificity of the mid-sort score is 50%. Assume the sensitivity of the high-sort classification is 60% and the specificity of the high-sort score is 90%.

For comparison of results, assume that an alternative strategy (without a machine) involves a laboratory practice where only high risk slides are reviewed by a manual QC process. For this laboratory assume the human QC review sensitivity is 100% (perfect humans). The review rate is established by the laboratory to be 25%. Therefore, given the assumed population distribution above, this lab will have an overall sensitivity in QC of 50%. This is because, if a slide is not sent for directed review, no review occurs. The 50% of the slides which were not in the high risk population will be missed.

Using the method of the invention and with the population and machine characteristics stated above, the sensitivity will be:

$$50\%*0.95+0.6*50\%=77.5\%$$

The review rate in this example is 20% (5% less workload than for the manual laboratory). The sensitivity and the specificity are improved compared to the directed laboratory quality control practice.

Figure 13B:
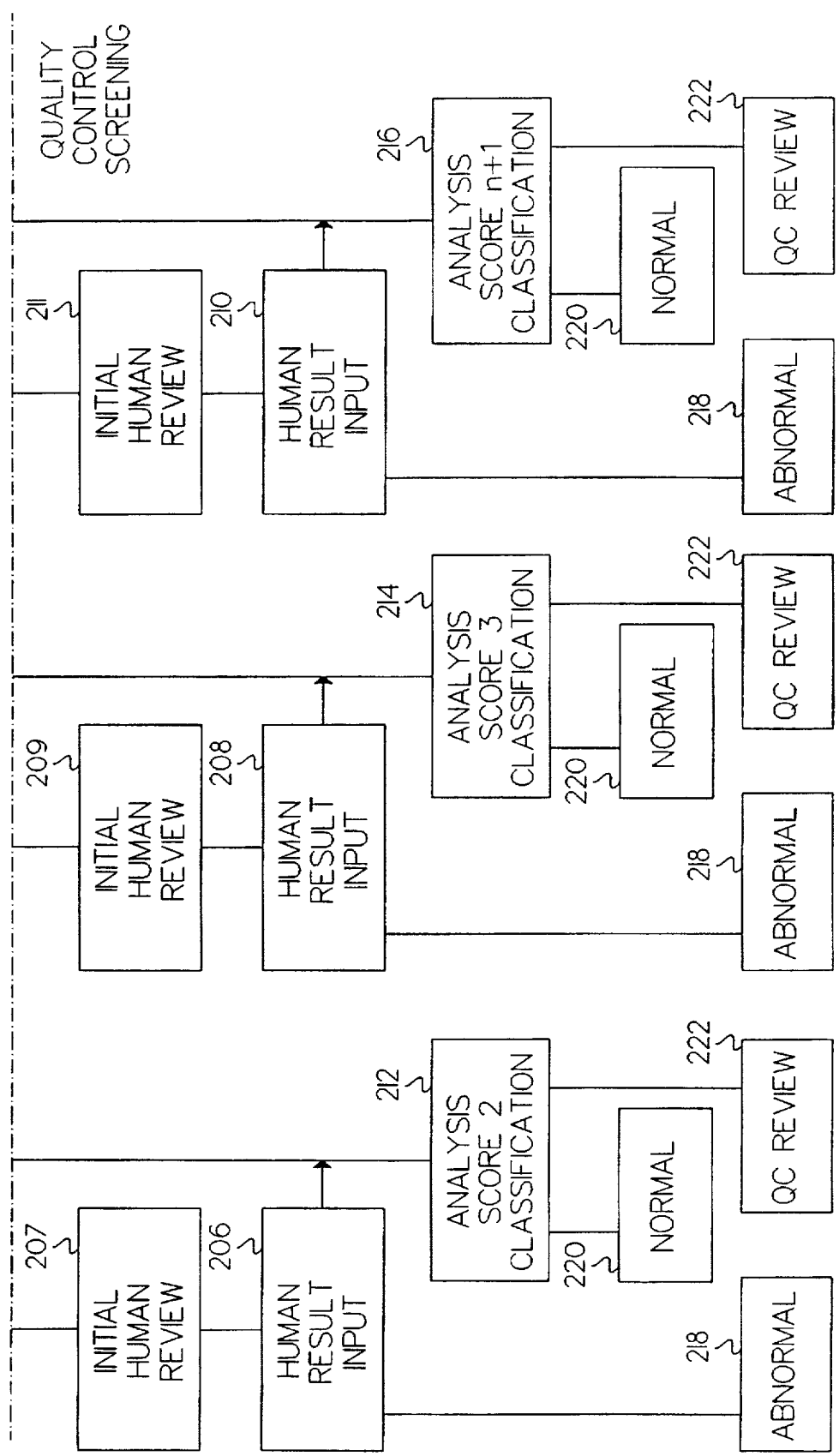
FIG. 13 comprises FIG. 13A and FIG. 13B which are intended to be pieced together to show a combined primary and quality control screening apparatus having a multiple score slide processing sorting classification.

Now refer to FIG. 13, comprising FIG. 13A and FIG. 13B, which shows the apparatus of the invention used for combining quality control and primary screening in one apparatus. All slides are processed at step 26. Multiples score slide processing is performed in step 192. A dispatcher 194 dispatches slides to multiple classifiers by patient data and multiple risk group data. The dispatcher uses risk data 196 from patient risk data 198. Analysis score classifications 200, 202 and 204 are used to classify the slides into review or normal classifications. Each review classification from each multiple score classification is sent for review by an initial human reviewer. Each of the initial human review steps 207, 209 and 211 provide a human review result inputs 206, 208 and 210. The human review decides whether the slide is abnormal 218 or can be further classified using an analysis score classifier 212, 214 or 216. The normal classification from analysis score classifications 200, 202, and 204 are also further classified using one of the analysis score classifications 212, 214 or 216. The analysis score classifier determines whether the slide is normal 220 or requires QC review 222.

The combined primary screening and quality control work flow is illustrated in FIG. 13. As shown in FIG. 13, the primary screening part of the work flow is exactly the same as the primary screening work flow described in FIG. 9. The quality control screening is essentially the same as the strategy described in FIG. 11. Note that all three scores may be generated after the slides are processed by the system. The scores may be used to direct the slides through both primary screening and quality control cycles. No additional slide processing is required. In this combined mode, a great economic benefit can be drawn from the automated system.

Figure 14B:
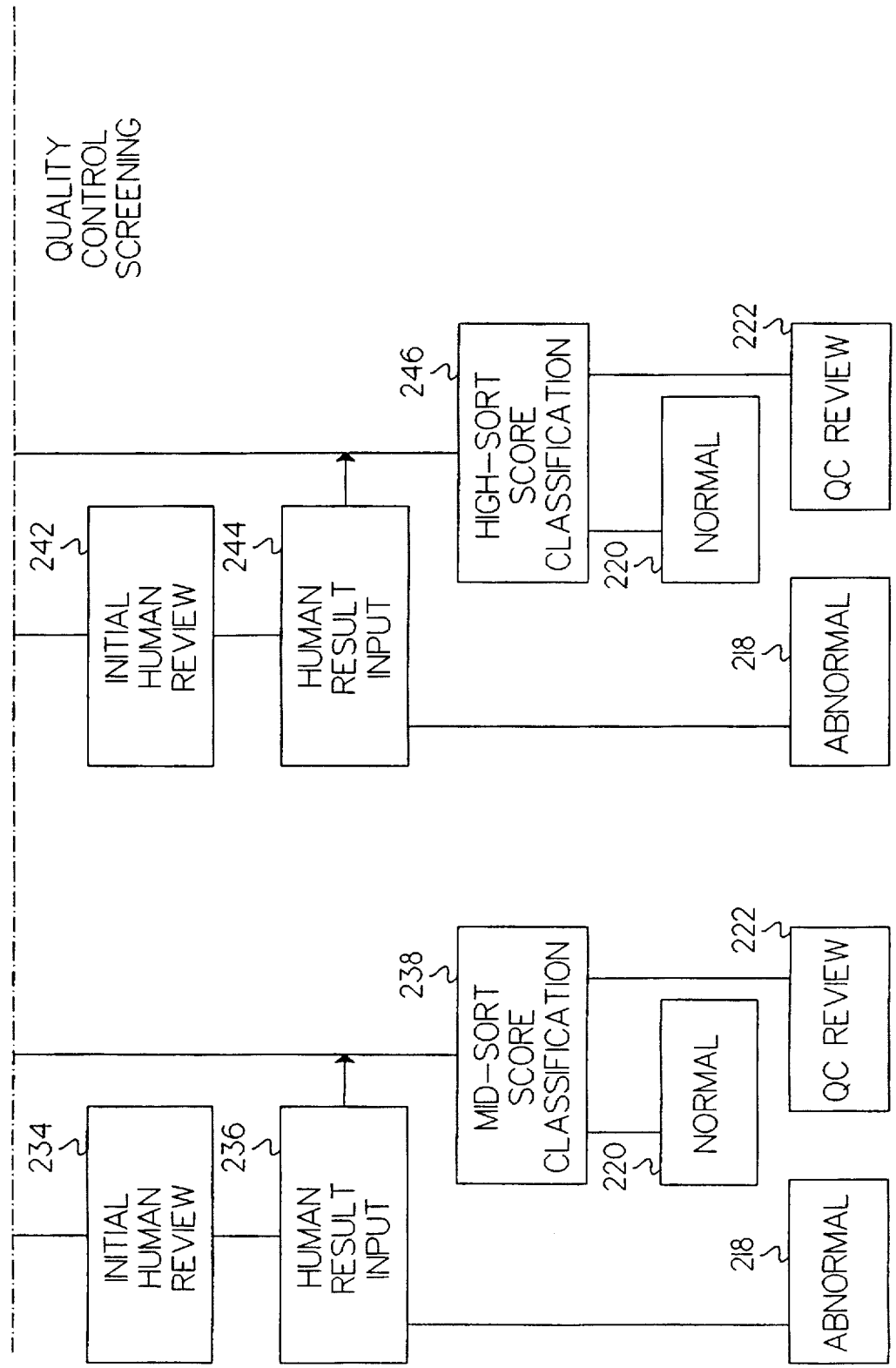
FIG. 14 shows a combined primary screening and quality control apparatus showing three score slide processing sorting and classification.

Now refer to FIG. 14, comprising FIG. 14A and FIG. 14B, which shows the method of the invention used for combining primary screening and quality control for a three score slide processing and sorting classification apparatus. Slides 26 are processed into a three score slide processing system 224. The dispatcher 226 takes risk data 228 from patient risk data 230. A high risk group and a low risk group classification segmentation is performed. The high risk group is sent to low-sort score classifier 232. The low risk group is sent to the mid-sort score classifier 240. The output of the classifiers are either review or normal. If reviewed, all slides marked for review are reviewed by a human at step 234 and at step 242. Each human result is input to human result input modules 236 and 244. If human results are normal, the slides are further processed by a mid-sort score classifier 238 and a high-sort score classifier 246. If the slide is considered not normal, the human indicates it as such at 218. The mid-sort score classifier 238 and the high-sort score classifier 246 provides a normal decision 220 or a QC review decision 222 for each slide considered normal by the human reviewer.

Now refer to FIG. 16 which shows a structure for the dispatcher. In process step 282, the patient risk data 280 are compared against risk group 1 ranges 281. If they match, the process flows to enable 289 a first predetermined analysis score classification. If the risk data 280 do not match the risk group 1 ranges 281 data then the risk data 280 are compared against the risk group 2 ranges 283. If they do, a second predetermined analysis score is enabled 293. If they do not, the process flows to step 286 and compared against all other risk group ranges 285. If it does not, an analysis score is selected for classification from the last predetermined risk group.

Now refer to FIG. 17 which shows the dispatcher used with the analysis score generators of the invention. Patient risk data 280 is compared to risk data group 1 ranges 282. If the patient risk data 280 is within the risk group 1 ranges 282 then enable 289 enables analysis score 1 selection 288 for the slide. Likewise, if the patient risk data 280 is within the risk group 2 ranges the enable 293 analysis score 2 selection 290. Likewise, in a check for the risk data in risk group N-1 ranges enable 295 enables analysis score n-1 selection 292. Finally, if the risk data is not within any of the previous ranges enable 297 enables, the last analysis score$_n$ 300 to be selected. Those skilled in the art appreciate that the individual analysis scores are selected by the dispatcher based on whether or not the risk data falls in any particular range but that other criteria may be used to enable a particular analysis score selection.

Refer now to FIG. 18 which shows the automated parameter determination of the invention. As described above, the exact specificity (sort rate) of the analysis scores can be fine tuned within their operating ranges to match the lab population/practice 304 and the desired economic benefits. The method and apparatus of the invention provide an automatic process for adjusting the analysis score specificities.

To determine optimal specificities, the ROC characteristics 306 of all analysis scores are estimated and made available beforehand. In addition, parameters 308 are determined 310 for each lab, including:

(1) the expected proportion of the high risk slides in a typical lab slide population, (2) the expected prevalence of the true abnormal slides in the high risk and the non-high risk slide population, and (3) the desirable normal review rate (1-specificity).

The optimal specificities for each analysis score can then be determined automatically. The specificities are adjusted to maximize the overall sensitivity given the known parameters and the desired normal review rate.

The parameter determination rules are provided by the following model and derivations. The model is based on the structure as shown in FIG. 15.

Notation as used herein is defined as follows

| | |
|---|---|
| N: | True normal, |
| A: | True abnormal, |
| n: | Analysis score called normal, |
| a: | Analysis score called abnormal, |
| U: | Overall population 50 including both high risk and non-high risk groups, |
| $E_i$: | Event i for i = 1, 2, ..., I |
| P(S): | The probability of occurrence of event S |
| P(S,T): | The joint probability of occurrence of event S and event T, |
| $P(S^{T/A})$: | The conditional probability of S given T |
| $R_i(x)$: | Receive operating characteristics function for analysis score; indicated by blocks 252, 254, and 256. |

An ROC curve for an analysis score may be defined by adjusting the value $P(a\backslash N)$ and determining and plotting the corresponding $P(a\backslash A)$ by repeatedly applying the equation, $P(a\backslash A)=R[P(a\backslash N)]$.

Since $$\sum_{i=1}^{I} P(E_i) = 1$$

we can arrive at the following relationship:

$$P(A) = \sum_{i=1}^{I} P(A,E_i) \ 272 \ \text{and} \ P(a,A) = \sum_{i=1}^{I} P(a,A,E_i)$$

Assuming that $P(A\backslash E_i)$ is known with values $\alpha_i$ and the ROC functions $R_i(x)$ is predetermined for $i=1, 2, \ldots, I$. The parameter optimization problem can be formulated as maximizing the overall abnormal sensitivity $P(a\backslash A)$ given the constant overall review rate $P(a)=\beta$.

Let $P(a\backslash N,E_i)=x_i$ then $P(a\backslash A,E_i)=R(x_i)$. By Bayes rule, the overall abnormal sensitivity can be expressed as:

$$P(a/A) = \frac{P(a,A)}{P(A)} = \frac{\sum_{i=1}^{I} R_i(x_i)\alpha_i P(E_i)}{\sum_{i=1}^{I} \alpha_i P(E_i)}$$

and the overall review rate is $$P(a) = \sum_{i=1}^{I} P(a/E_i)P(E_i)$$

$$= \sum_{i=1}^{I} [P(a/N,E_i)P(N/E_i) + P(a/A,E_i)P(A/E_i)]P(E_i)$$

$$= \sum_{i=1}^{I} [x_i(1-\alpha_i) + R_i(x_i)\alpha_i]P(E_i)$$

Let $f=\beta-P(a)$. To make sure the given review rate $\beta$ can be achieved, $f=0$ must be assured. This establishes a constraint in the Lagrange multiplier, $\lambda$. A cost function may be defined as $$\text{Cost}=P(A) \ P(a/A)+\lambda f$$

where $P(A)$ is a constant. The maximization of Cost can be conducted by adjusting the false positive operating points of the analysis scores i. i.e., $x_i$ for $i=1, 2, \ldots, I$. The Cost may be rewritten as $$\text{Cost} = \lambda\beta + \sum_{i=1}^{I} [\{R_i(x_i)\alpha_i P(E_i)\} - \lambda\{[x_i(1-\alpha_i) + R_i(x_i)\alpha_i]P(E_i)\}]$$

The partial derivatives of Cost vs. $x_i$ are $$\delta \text{Cost}/\delta x_i = P(E_i)[(1-\lambda)R_i'(x_i)\alpha_i - \lambda(1-\alpha_i)]$$

where $R_i'(x)=dR_i(x)/dx$. To find a solution, let $\delta\text{Cost}/\delta x_i=0$ for $i=1, 2, \ldots, I$ and this yields $$\frac{\alpha_1}{1-\alpha_1} R_1'(x_1) = \frac{\alpha_2}{1-\alpha_2} R_2'(x_2) = \ldots = \frac{\alpha_I}{1-\alpha_I} R_I'(x_I) \quad (1)$$

By solving equation (1) and $f=0$ which implies $$\sum_{i=1}^{I} [x_i(1-\alpha_i) + R_i(x_i)\alpha_i]P(E_i) = \beta \quad (2)$$

we can arrive at a solution of the maximization problem.

The Newton-Rapson method can be used to solve equations (1) and (2). To apply this method without loss of generality, we have $$df/dx_1 = -\sum_{i=1}^{I} (\delta x_i)/(\delta x_1)P(E_i)[(1-\alpha_i) + R_i'(x_i)\alpha_i] \quad (3)$$

where $$\frac{\delta x_i}{\delta x_1} = \frac{\alpha_1(1-\alpha_i) R_1''(x_1)}{\alpha_i(1-\alpha_1) R_i''(x_i)} \quad (4)$$

and $R_1''(x)=d^2R_1(x)/dx^2$ and $R_i''(x)=d^2R_i(x)/dx^2$. The iteration rule is $$(x_1)_n = (x_1)_{n-1} - f_{n-1}/f'_{n-1} \quad (5)$$

where $(x_1)_n$, $f_n$ and $f'_n$ are $x_1$, $f$ and $df/dx_1$ at the n-th iteration respectively. The procedure comprises the following steps:

| Step 1 | Set n = 0, and initialize $x_1$ |
|---|---|
| Step 2 | Calculate $x_i$ using equation (1) for all i = 2, ... I |
| Step 3 | Calculate $f$ and $df/dx_1$ using equations (3) and (4) |
| Step 4 | If |f| is small enough, then stop. Otherwise go to Step 5 |
| Step 5 | Update $x_i$ using Equation (5) and go to Step 2 |

The above explanation is directed to analytic ROC functions, but in many cases, ROC functions in analytic form are not available. When only empirical data for ROC functions exists, discrete ROC functions may be generated. From these discrete ROC functions, interpolation is carried out using curve fitting methods from smooth curve families. Such an approximation yields the first order and second order derivative, so the above iteration method may be solved.

As disclosed herein, the method of the invention employs a highly efficient method and apparatus to perform medical screening using a computer aided system. Those skilled in the art will recognize that the method and apparatus of the invention may be applied to areas including cytology, urology, radiology, and other medical applications. Furthermore, the method and apparatus of the invention are applicable to other scientific and industrial screening and quality control applications where high risk cases may be identified prior to classification.

Those skilled in the art will recognize that various alternative methods and apparatus may be used to generate an analysis score for a biological specimen. One type of analysis score generator achieves a balance between accuracy and robustness in an automated system. To achieve the accuracy of the system, a distributed processing method is used. Multiple classifiers are designed, each is specialized in a specific range of feature variations to maximize its accuracy in that range. An information integration method is designed to integrate the highly accurate performance in each range into a highly robust and accurate system that performs over a full range of feature variations. The analysis score generator of the invention utilizes: (1) a determination of the overall classifier structure, (2) a distributed classifier development, and (3) multiple classifier integration.

Refer now to FIG. 19 which shows a block diagram of the robust classification apparatus of the invention. FIG. 19 is one example of the analysis score generator based on four distributed clusters. The cluster membership generator 424 generates the membership values for each classifier, $\mu_1$, $\mu_2$, $\mu_3$, and $\mu_4$. Each classifier 426, 428, 430 and 432 generates the possibilities, or probabilities of being abnormal for each slide. The output of each classifier can be biased, so an offset value is introduced to compensate the bias effects.

The slide feature set 422 is input to a membership generator 424, a first classifier 426, a second classifier 428, a third classifier 430, and a fourth classifier 432. The slide feature sets are used by the classifiers to provide an output that classifies the particular feature subset selected by the classifier. The outputs of each classifier are offset by predetermined offsets, at summing points 434, 436, 438 and 440, that are used to adjust to variations in the feature set. The resulting outputs of the weighted outputs of each classifier are added together using the summer 450 to provide an aggregate classification output 452.

To determine the classifier structure, data is acquired from multiple sources with as wide a set of variations as possible. The gathered data are used to establish data clusters. The slide specimens within each cluster have very similar characteristics. Unsupervised clustering methods can be used to determine the number of clusters and data may be assigned to each cluster. The unsupervised clustering method provides the clusters which have a similar characteristic within each cluster. The most popular and general methods of the unsupervised clusterings are disclosed in J. T. Tou and R. C. Gomalez, *Pattern Recognition Principles*, Addisson-Wesley Publishing Company, 1974. Some examples of unsupervised clustering include an isodata algorithm, fuzzy isodata algorithm, k means clustering algorithm, and fuzzy c means clustering. The method of the invention is based on the distance measured in feature space or performance space. In a training stage, if a priori information concerning the slide is not available, then the unsupervised clustering algorithm on the feature space may be used. However, if a priori information is available, for example, knowledge of the staining method, sampling method, or laboratory information, an unsupervised clustering algorithm on the performance space may be used rather than the feature space. The method in a preferred embodiment of the invention uses the following as a performance measure. The cluster is built from the available slides and the performance in sensitivity and specificity is examined. The specificity and sensitivity as an ordered pair, forms the performance space. The performance measure is used to group slides of different known variations such as staining difference into difference clusters.

In the cases where no a priori information is available for the samples, the clustering can be done based on feature distributions. The features that a clustering method may use include but are not limited by the darkness of the slide stain which reflect the staining method used, nuclear size which could reflect the slide preparation method used, or the risk group that patients are from. This clustering result determines the number of classifiers needed and the range of feature variations that each classifier will be specialized in. This is the major step to reduce the performance variation and degradation due to variations of the characteristics of the slides.

Given these clustering results, all the available slide characteristics are searched for the indicators and features that can best predict which cluster each slide will belong to. With these indicators and the given cluster, the membership generator 424 shown in FIG. 19 is built. This membership generator would assign membership values $\mu_i$ where $0 \leq \mu_i \leq 1$ which are the possibilities, or probabilities that a specimen has originated from cluster i. Since the sum of the membership values is not necessarily equal to one, the membership values are normalized by the sum of the membership values. For example, if the membership values are $\mu_1, \mu_2, \ldots, \mu_c$, then the normalized membership value is:

$$\mu_i \Leftarrow \mu_i / \sum_{c=1}^{C} \mu_c$$

Based on the clustering results, a classifier is developed for each cluster. The data used to train each classifier are all the available data samples of all clusters, however, each sample is weighted by a factor which is the cluster membership value $\mu_i$ computed in the first step. This enables a proportionate and smooth contribution of each data sample to the classifier that is designed to be specialized for the cluster. Using this method, the variation of the overall result can be reduced in comparison to other methods using a clear-cut, exclusive training data set for each classifier. Those skilled in the art will recognize that the classifier is not limited, to a fuzzy type of classifier and that others may be used.

One fuzzy type classifier is the binary fuzzy decision tree. The structure of binary fuzzy decision tree is the same as the conventional binary decision tree. However, the operations of the nodes and links are different. The following is an example of the operation.

In a nonterminal node, let $\bar{x}$ be an input feature vector; and $\bar{w}$ be the selected unit projection vector. $P_L(P_R)$ and $\sigma_L(\sigma_R)$ be the mean and standard deviation of the projection scalars derived from the training population that went to the descending node. The conditional possibilities of reaching the direct left and right descending nodes from the 15 nonterminal node, $\mu_L$, $\mu_R$, are computed based on the following equations. Note that the conditional possibility of reaching root node Q is 1.

$$\mu_L(\bar{x}) = 1 - \mu_R(\bar{x}) = \frac{1}{1 + fac(\bar{x})}$$

where $$fac(\bar{x}) = \frac{\sigma_L}{\sigma_R} \exp\left[ \frac{1}{2k^2} \left( \frac{\eta_L}{\sigma_L^2} - \frac{\eta_R}{\sigma_L^2} \right) \right]$$

and

-continued $$\eta_L = \begin{cases} (p-p_L)^2; & (p-p_L)(p_R-p_L) > 0 \\ 0; & \text{otherwise} \end{cases}$$

and $$\eta_R = \begin{cases} (p-p_R)^2; & (p-p_R)(p_L-p_R) > 0 \\ 0; & \text{otherwise} \end{cases}$$

$p=\bar{w}^T\bar{x}$ and k is the adjustment factor for the conditional possibility function. If k=1, then the possibility becomes probability under the Gaussian distribution assumption.

The link operation depends on the structure of the tree. From the structure of the tree, the parent node and child node relationship along any path from the root node to a terminal node is defined. To estimate the possibility of reaching a certain terminal node i, borrowing from the Baysian conditional probability, multiply the conditional possibility value of each node along the path from the root node to terminal node i:

$$poss(i,\bar{x}) = \prod_{j=1}^{N} \mu_{sj}(j,\bar{x})$$

where $_{sj}$ is L(R) if $(j-1)^{th}$ ascendant is left (right) side of $j^{th}$ ascendant.

Given a fixed tree structure, the evidence values of terminal nodes based on a training data set are computed. The evidence values are the probability that $\bar{x}$ belongs to different classes for each terminal node, based upon the training data. If the possibilities of terminal nodes are $$poss(0,\bar{x}), poss(1,\bar{x}), \ldots, poss(T,\bar{x})$$

and their associated evidence value of class c are $$evid(0,c), evid(1,c), \ldots, evid(T,c),$$

then the membership to a given class c is $$mem(c,\bar{x}) = \sum_{i=0}^{T} poss(i,\bar{x}) \cdot evid(i,c)$$

For the membership generator, the outputs of the membership generator are $mem(c,\bar{x})$, $1 \leq c \leq C$. For the classifiers, the outputs from each of the classifiers are $mem(c,\bar{x})$, where c is an abnormal class.

To explain the operations of the tree, a hypothetical example is provided. One example tree structure is shown in FIG. 20. Given an input feature vector $\bar{x}$ we further assume the computed conditional possibilities of each nonterminal node. For example, $\mu_L$, $\mu_R$ of nonterminal node 0 are 0.9 and 0.1.

Based on the above conditional possibilities, the possibility value for each terminal node is:

$poss(0,\bar{x}):0.9 \cdot 0.2=0.18$ $poss(1,\bar{x}):0.1 \cdot 0.3=0.03$ $poss(2,\bar{x}):0.9 \cdot 0.8 \cdot 0.7=0.504$ $poss(3,\bar{x}):0.9 \cdot 0.8 \cdot 0.3=0.216$ $poss(4,\bar{x}):0.1 \cdot 0.7 \cdot 0.4=0.028$ $poss(5,\bar{x}):0.1 \cdot 0.7 \cdot 0.6=0.042$ The following are the evidence values for each terminal node:

| Terminal Node # | Class 0 | Class 1 | Class 2 | Class 3 |
|---|---|---|---|---|
| 0 | 0.35 | 0.45 | 0.08 | 0.12 |
| 1 | 0.04 | 0.03 | 0.50 | 0.43 |
| 2 | 0.34 | 0.34 | 0.15 | 0.17 |
| 3 | 0.23 | 0.20 | 0.30 | 0.27 |
| 4 | 0.27 | 0.24 | 0.26 | 0.23 |
| 5 | 0.16 | 0.10 | 0.40 | 0.34 |

The membership value for each class is:

$mem(Class0,\bar{x})$: $0.35 \cdot 0.18 + 0.04 \cdot 0.03 + 0.34 \cdot 0.504 +$
$0.23 \cdot 0.216 + 0.27 \cdot 0.028 + 0.16 \cdot 0.042 =$
$0.300$ $mem(Class1,\bar{x})$: $0.45 \cdot 0.18 + 0.03 \cdot 0.03 + 0.34 \cdot 0.504 +$
$0.20 \cdot 0.216 + 0.24 \cdot 0.028 + 0.10 \cdot 0.042 =$
$0.307$ The information produced by the distributed classifiers $mem(Class2,\bar{x})$: $0.08 \cdot 0.18 + 0.50 \cdot 0.03 + 0.15 \cdot 0.504 +$
$0.30 \cdot 0.216 + 0.26 \cdot 0.028 + 0.40 \cdot 0.042 =$
$0.194$ $mem(Class3,\bar{x})$: $0.12 \cdot 0.18 + 0.43 \cdot 0.03 + 0.17 \cdot 0.504 +$
$0.27 \cdot 0.216 + 0.23 \cdot 0.028 + 0.34 \cdot 0.042 =$
$0.199$ are integrated by the following method. Using the membership values and the results of the classifier for each clusters, the final result is computed as:

$$output = \frac{\sum_{c=1}^{C} \mu_i(output_i - offset_i)}{\sum_{c=1}^{C} \mu_i}$$

where output and $output_i$ are the final classification result and result of classifier i. The $offset_i$ is an offset value to adjust the bias value of classifier i. The bias is adjusted to achieve a balance of the accuracy and robustness. The above is for the operation of the classifier.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A biological specimen classification apparatus for classification of a biological specimen from a patient, using previously known patient risk data, said apparatus comprising:

(a) means for acquiring at least one image of said biological specimen having at least one image output;

(b) means for extracting at least one slide feature from said at least one image having at least one slide feature output;

(c) means for generating a plurality of analysis scores connected to said at least one slide feature output having a plurality of analysis score outputs;

(d) means for entering the patient risk data; and (e) means, coupled to the entering means, for dispatching each of the plurality of analysis scores to a selected one of a plurality of analysis score classifiers, wherein the dispatching means selects the selected one of the plurality of analysis score classifiers according to said patient risk data, wherein said means for dispatching is also connected to said plurality of analysis score outputs, and said means for dispatching has a plurality of dispatched outputs, wherein each one of said plurality of analysis score classifiers has an input connected to one of said plurality of dispatched outputs and wherein each one of said plurality of analysis score classifiers has a specimen classification output.

2. The apparatus of claim 1 wherein each of said plurality of analysis score generators further comprises a means for maximizing classification sensitivity responsive to at least one range of specificity.

3. The apparatus of claim 1 wherein each of said plurality of classification modules comprises:

(a) means for generating a normal threshold responsive to a predetermined specificity; and (b) means for comparing said plurality of analysis scores to said normal threshold having an output connected to said biological specimen classification output.

4. The apparatus of claim 3 wherein said normal threshold is determined responsive to a cumulative distribution analyzer.

5. The apparatus of claim 3 wherein said means for comparing further comprises a normal output and a review output.

6. The apparatus of claim 1 wherein said means for generating a plurality of analysis scores comprises a low-sort scorer, a mid-sort scorer, and a high-sort scorer.

7. The apparatus of claim 1 wherein said biological specimen comprises a specimen prepared by the Papanicolaou method.

8. The apparatus of claim 1 wherein said biological specimen comprises a gynecological specimen.

9. A biological specimen classification apparatus for classification of a biological specimen from a patient using previously known patient risk data, said apparatus comprising:

(a) means for acquiring at least one image of said biological specimen having at least one image output;

(b) means for extracting at least one slide feature from said at least one image output having at least one slide feature output; and (c) means for generating a plurality of analysis scores responsively to said patient risk data and said at least one slide feature, said means for generating a plurality of analysis scores connected to said at least one slide feature output, wherein said means for generating a plurality of analysis scores has a plurality of analysis score outputs.

10. The biological specimen classification apparatus of claim 9 further comprising a plurality of means for classifying a biological specimen connected to said plurality of analysis score outputs, wherein each one of said plurality of means for classifying a biological specimen has a biological specimen classification output.

11. The apparatus of claim 9 wherein said means for generating a plurality of analysis scores further comprises a means for maximizing sensitivity of classification for each analysis score responsive to at least one range of specificity.

12. The apparatus of claim 9 wherein said means for classifying a biological specimen comprises:

(a) means for generating a normal threshold responsive to a predetermined specificity; and (b) means for comparing at least one of said plurality of analysis scores to said normal threshold having an output connected to the biological specimen classification output.

13. The apparatus of claim 12 wherein said means for determining a normal threshold comprises a cumulative distribution analyzer.

14. The apparatus of claim 12 wherein said means for comparing comprises a normal output and a review output.

15. The apparatus of claim 9 wherein said means for generating a plurality of analysis scores comprises a low-sort scorer, a mid-sort scorer, and a high-sort scorer.

16. The apparatus of claim 9 wherein said biological specimen comprises a specimen prepared by the Papanicolaou method.

17. The apparatus of claim 9 wherein said biological specimen comprises a gynecological specimen.

18. A biological specimen classification apparatus for classification of a biological specimen comprising:

(a) means for acquiring a plurality of scores from a biological specimen having a plurality of analysis score outputs;

(b) means for sorting said biological specimen responsively to previously known patient risk data into at least one risk group;

(c) means for assigning each analysis score to at least one risk group, wherein the means for assigning has at least one risk assigned analysis score; and (d) means for classifying said biological specimen responsively to said at least one risk assigned analysis score.

19. The apparatus of claim 18 further comprising a means for primary screening.

20. The apparatus of claim 18 further comprising a low-sort scorer and classifier, a high-sort scorer and classifier.

21. The apparatus of claim 18 further comprising a means for quality control screening.

22. The apparatus of claim 21 further comprises a low-sort scorer and classifier and a high-sort scorer and classifier.

23. The apparatus of claim 18 wherein said means for assigning further comprises a means for assigning analysis scores having higher sensitivity to cases with higher risk.

24. The apparatus of claim 18 wherein said biological specimen comprises a specimen prepared by the Papanicolaou method.

25. The apparatus of claim 18 wherein said biological specimen comprises a gynecological specimen.

26. The apparatus of claim 18 further comprising a means for automatic classifier parameter determination comprising means for automatically generating an optimal specificity for each analysis score connected to receive at least one laboratory specific parameter and a predetermined review rate.

27. A biological specimen classification apparatus for classification of a biological specimen comprising:

(a) means for acquiring a plurality of scores from a biological specimen having a plurality of analysis score outputs;

(b) means for entering patient risk data;

(c) means for sorting said biological specimen responsively to said patient risk data, where said biological specimen is sorted into at least one risk group output;

(d) means for primary screening for sort specimen into normal and reveiw responsive to said at least one risk group output;

(e) means for entering human reveiw results; and (f) means for reclassifying specimens responsive to said risk group output, human reveiw results, and analysis score output having a normal output and a quality control reveiw.

28. The apparatus of claim 27 further comprises a low-sort scorer and classifier, a mid-sort scorer and classifier, and a high-sort scorer and classifier.

29. The apparatus of claim 27 further comprising a means for combined primary screening and quality control.

30. The apparatus of claim 27 wherein said means for assigning further comprises a means for assigning analysis scores having higher sensitivity to cases with higher risk.

31. The apparatus of claim 27 wherein further comprising a means for automatic classifier parameter determination comprising:

(a) means for entering at least one laboratory specific parameter;

(b) means for entering a predetermined review rate; and (c) means for automatically generating an optimal specificity for each analysis score connected to receive the at least one laboratory specific parameter and predetermined review rate.

32. The apparatus of claim 27 wherein said biological specimen comprises a specimen prepared by the Papanicolaou method.

33. The apparatus of claim 27 wherein said biological specimen comprises a gynecological specimen.

* * * * *